(12) United States Patent
VanderVelde

(10) Patent No.: US 7,208,676 B2
(45) Date of Patent: *Apr. 24, 2007

(54) ADJUSTABLE MID-PANEL SPILLOVER FITTING

(75) Inventor: Charles VanderVelde, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/847,835

(22) Filed: May 18, 2004

(65) Prior Publication Data

US 2004/0206531 A1    Oct. 21, 2004

Related U.S. Application Data

(63) Continuation of application No. 10/393,241, filed on Mar. 20, 2003, now Pat. No. 6,756,539.

(51) Int. Cl.
*H02G 3/10* (2006.01)
(52) U.S. Cl. .................. 174/48; 174/68.1; 174/49; 138/162; 248/68.1; 52/220.3; 52/220.7
(58) Field of Classification Search .............. 174/48, 174/68.1, 49, 72 A, 72 R, 97, 96, DIG. 7, 174/68.3, 99 R; 138/162; 52/36.1, 36, 241, 52/220, 221, 220.3, 36.2, 239, 220.7; 248/68.1
See application file for complete search history.

(56) References Cited

U.S. PATENT DOCUMENTS

| | | | |
|---|---|---|---|
| 2,119,319 A | 5/1938 | D'Esopo | |
| 4,747,506 A | 5/1988 | Stuchlik, III | |
| 5,067,678 A | 11/1991 | Henneberger et al. | |
| 5,161,580 A | 11/1992 | Klug | |
| 5,394,658 A | 3/1995 | Schreiner et al. | |
| 5,469,893 A * | 11/1995 | Caveney et al. | 138/162 |
| 5,685,113 A | 11/1997 | Reuter et al. | |
| 5,831,211 A | 11/1998 | Gartung et al. | |
| 5,861,576 A | 1/1999 | Langston et al. | |
| 5,923,753 A | 7/1999 | Haataja et al. | |
| 5,937,131 A | 8/1999 | Haataja et al. | |
| 6,002,089 A | 12/1999 | Hemingway et al. | |
| 6,037,538 A * | 3/2000 | Brooks | 174/48 |
| 6,156,977 A | 12/2000 | Benito-Navazo | |
| 6,164,338 A * | 12/2000 | Holzer et al. | 138/106 |
| 6,349,516 B1 | 2/2002 | Powell et al. | |
| 6,408,579 B1 | 6/2002 | Anderson et al. | |
| 6,448,495 B1 * | 9/2002 | Mattei et al. | 174/48 |
| 6,450,458 B1 | 9/2002 | Bernard | |

* cited by examiner

*Primary Examiner*—Dhiru R. Patel
(74) *Attorney, Agent, or Firm*—Robert A. McCann; Christopher S. Clar

(57) ABSTRACT

An adjustable mid-panel spillover fitting is disclosed. The fitting includes a base, a cover securable to the base, and a cover cap securable to the base and the cover. The base has a spillover side, and the cover has an opening on a side wall thereof for receiving the spillover side. The cover has a shelf extending toward the side wall, and the cover cap has a groove for receiving the shelf therein. The cover cap includes at least one latch on an inside surface thereof for securing the cover cap to the base in a plurality of predetermined positions, and the cover cap is adjustable between the plurality of predetermined positions.

18 Claims, 19 Drawing Sheets

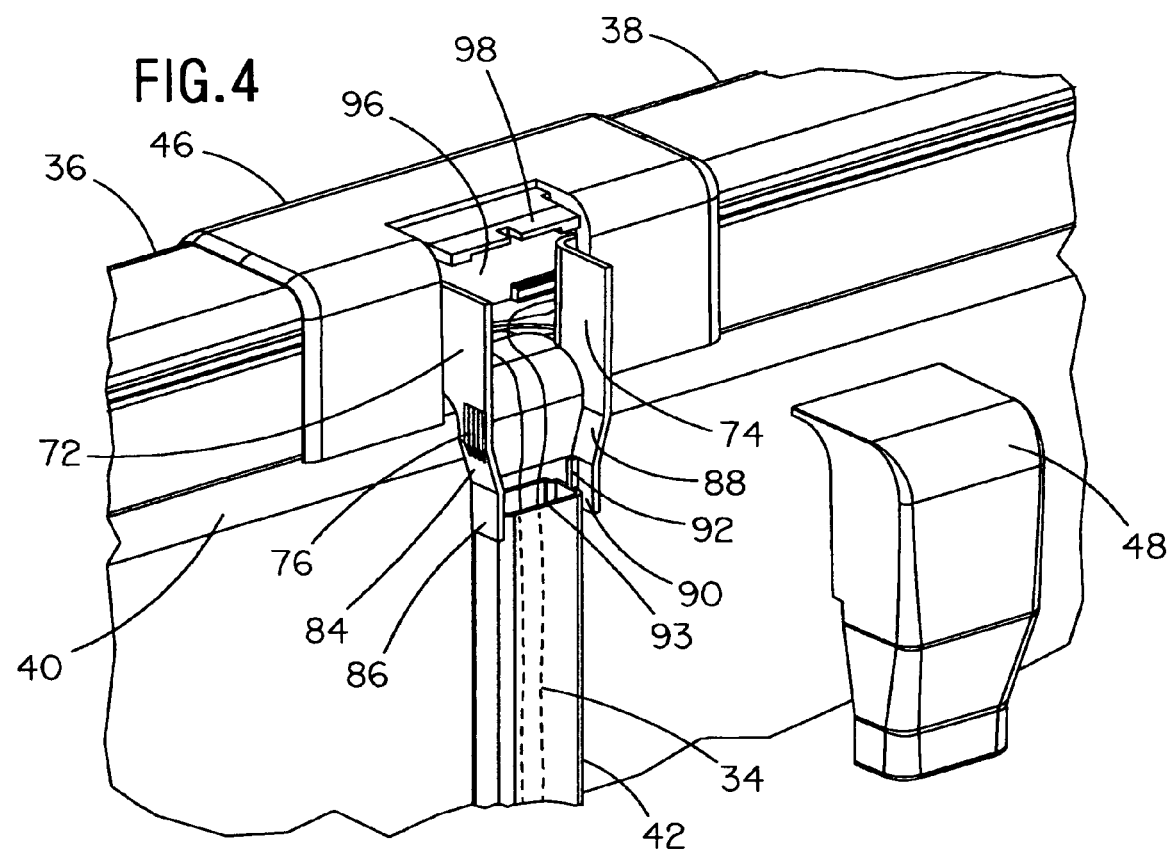
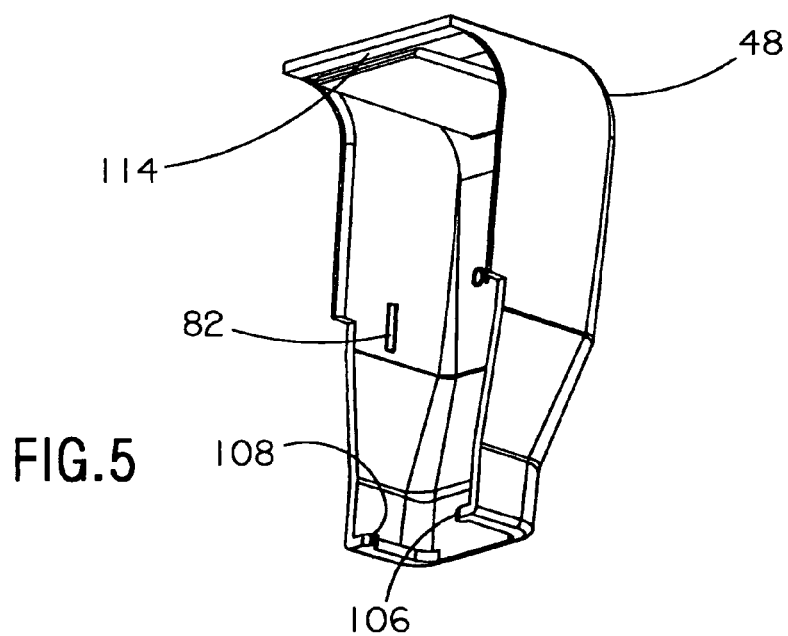

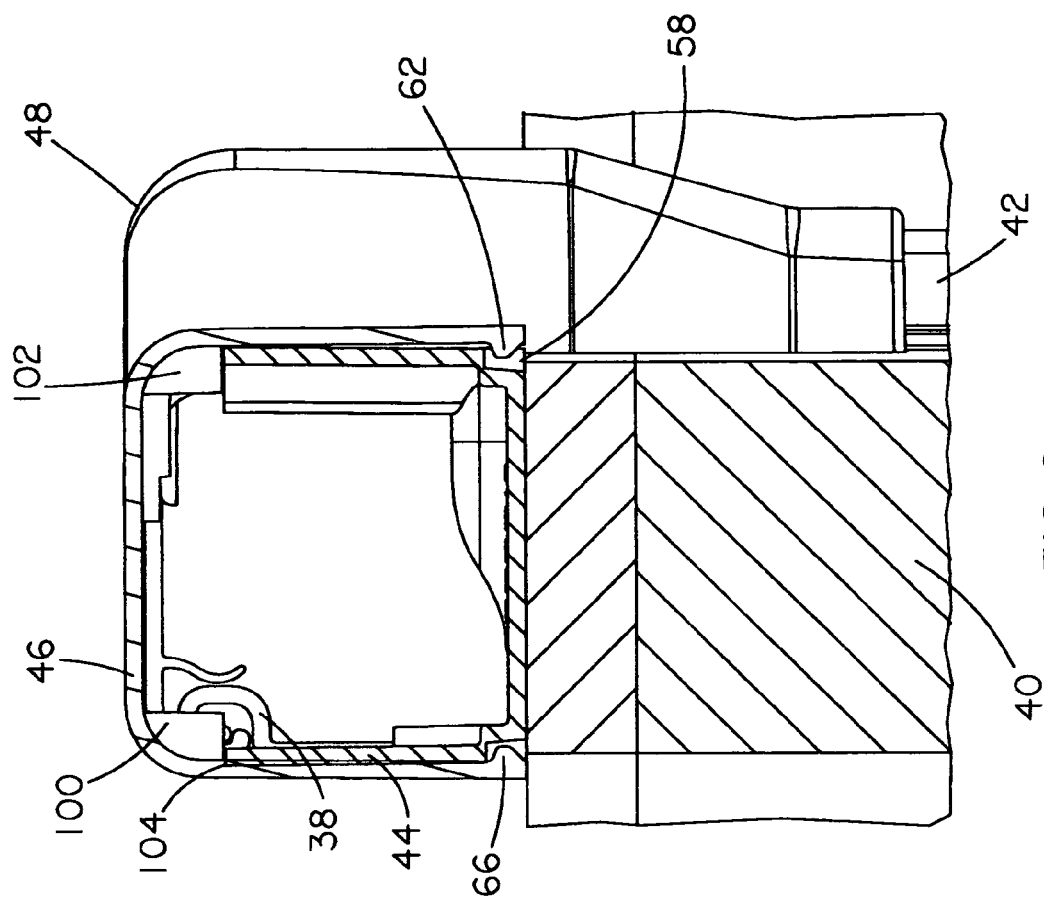
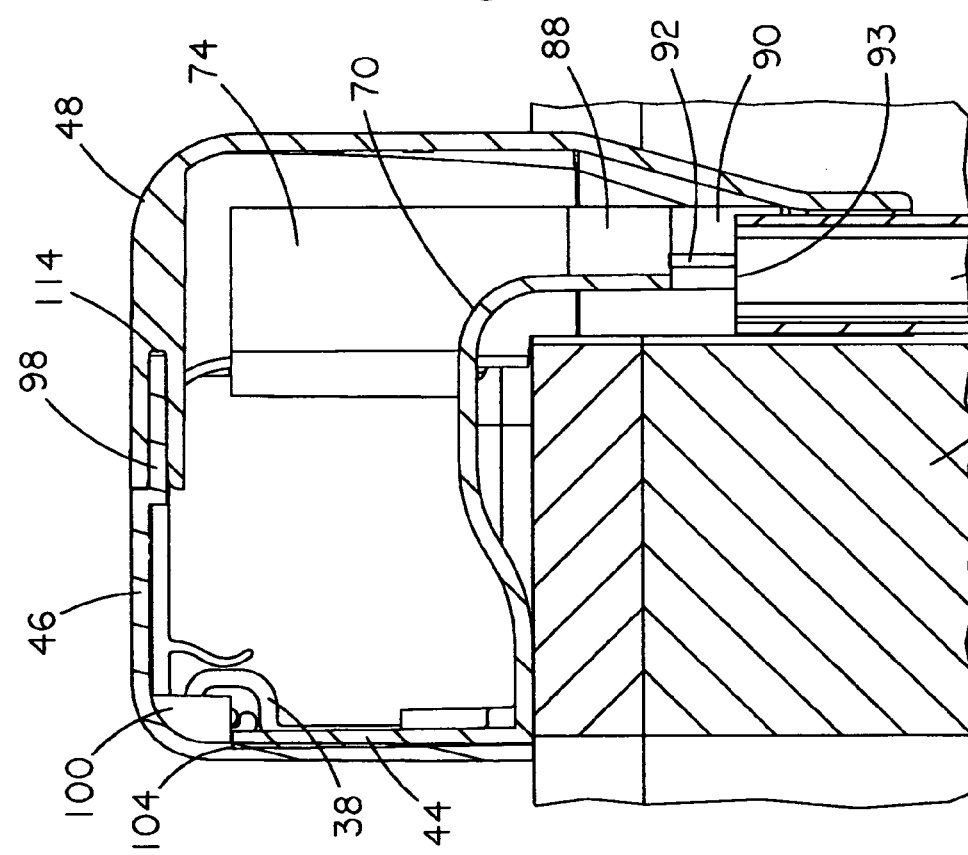

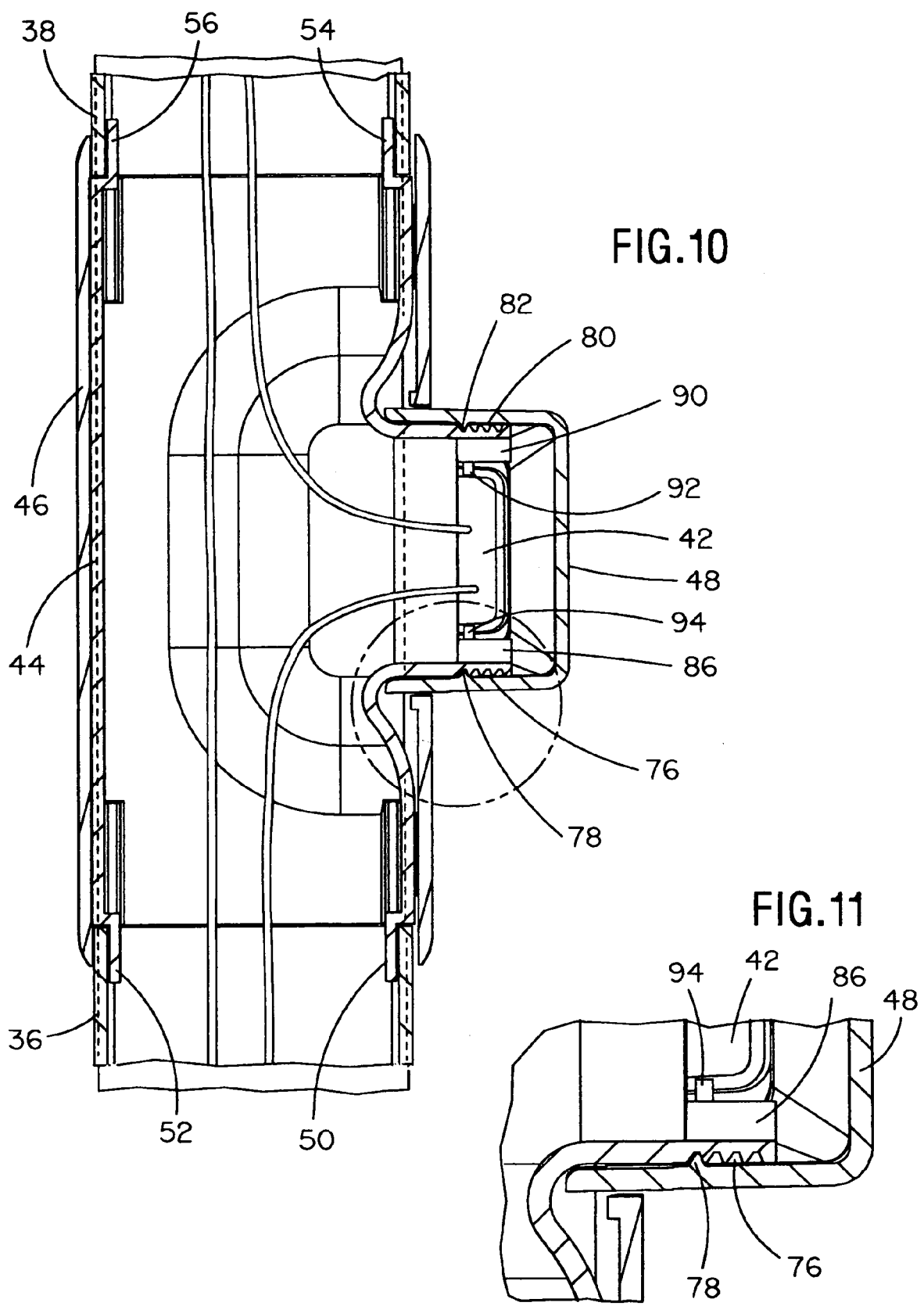

ADJUSTABLE MID-PANEL SPILLOVER FITTING

CROSS-REFERENCES TO RELATED APPLICATIONS

This application is a continuation of application Ser. No. 10/393,241, filed Mar. 20, 2003, now U.S. Pat. No. 6,756,539.

BACKGROUND OF THE INVENTION

The present invention is directed to a spillover fitting and, more particularly, to an adjustable mid-panel spillover fitting.

Cable management systems are known in the raceway industry. One such system is disclosed in U.S. Pat. No. 5,831,211. The '211 patent discloses a raceway 34 comprised of a series of cable channels 36 which mount to the top of most major partition panel configurations and associated cable channel caps 38 which mount on the cable channels 36 in various positions to accommodate the different partition panel configurations.

As shown in FIGS. 2–4 of the '211 patent, the shape of the cable channel 36 permits the cable channel to mount directly onto three of the most popular partition panel upper surface configurations and, thus, eliminates the need for individual cable channel shapes for most of the current partition panels in use. The grooved teeth 50 engage the sides of the cable channel at variable heights to allow different-sized panel widths to be mated with the cable channel cap 38. However, none of the cable management systems, including the one disclosed in the '211 patent, provide a mid-panel spillover fitting having a cover cap securable to a base and adjustable between a plurality of predetermined positions to accommodate various widths of office furniture panels.

SUMMARY OF THE INVENTION

It would be desirable to provide an adjustable mid-panel spillover fitting that accommodates various widths of office furniture panels.

It would also be desirable to provide an adjustable mid-panel spillover fitting having a cover cap securable to a base and adjustable between a plurality of predetermined positions.

A first adjustable mid-panel spillover fitting is disclosed. The fitting includes a base, a cover securable to the base, and a cover cap securable to the base and the cover. The base has a spillover side, and the cover has an opening on a side wall thereof for receiving the spillover side. The cover has a shelf extending towards the side wall, and the cover cap has a groove for receiving the shelf therein. The cover cap includes at least one latch on an inside surface thereof for securing the cover cap to the base in a plurality of predetermined positions, and the cover cap is adjustable between the plurality of predetermined positions.

Preferably, the base is mounted to a top surface of an office furniture panel, and the base has four flanges for engaging inside walls of two horizontal raceway sections. Moreover, the base has four slots for receiving four latches to secure the cover therein.

Preferably, the spillover side has two vertical walls for guiding cable into a vertical raceway section, and each vertical wall has a plurality of grooves on an outside surface thereof for securing at least one latch at a plurality of predetermined positions.

Preferably, the spillover side has two tapered sections adjacent the vertical walls and two side walls adjacent the tapered sections. Moreover, the side walls form a channel having a width substantially equal to a width of the vertical raceway section, and each side wall has a rib on an inside surface thereof for engaging an end of the vertical raceway section.

Preferably, the cover is U-shaped and has a length greater than the length of the base. Moreover, the cover has a plurality of ribs on an inside surface thereof for engaging a top surface of the base.

Preferably, the cover cap has two latches for retaining a vertical raceway section therein, and the cover cap is adjustable between any one of four predetermined positions.

A second adjustable mid-panel spillover fitting is disclosed. The fitting includes a base, a cover securable to the base, a first cover cap securable to the base and the cover, and a second cover cap securable to the base and the cover. The base has a first spillover side and a second spillover side to allow cable from a raceway running horizontally along the top of office furniture panels to spillover both sides in a vertical direction. Each of the first and second cover caps is adjustable between a plurality of predetermined positions.

BRIEF DESCRIPTION OF FIGURES

FIG. 4 is a partially exploded perspective view of the raceway system of FIG. 1;

FIG. 5 is a perspective view of a cover cap utilized in the raceway system of FIG. 1;

FIG. 8 is a cross-sectional view taken along lines 8—8 of FIG. 6;

FIG. 9 is a cross-sectional view taken along lines 9—9 of FIG. 6;

FIG. 10 is a cross-sectional view taken along lines 10—10 of FIG. 7, showing the cover cap secured in a first position;

FIG. 11 is an enlarged view of a section of FIG. 10;

DETAILED DESCRIPTION OF PREFERRED EMBODIMENTS

The illustrative embodiments of the invention are directed to an adjustable mid-panel spillover fitting having the ability to accommodate different widths of office furniture panels. FIGS. 1–17 are directed to a raceway system 30, and FIGS. 18–28 are directed to a raceway system 32.

Figure 1:
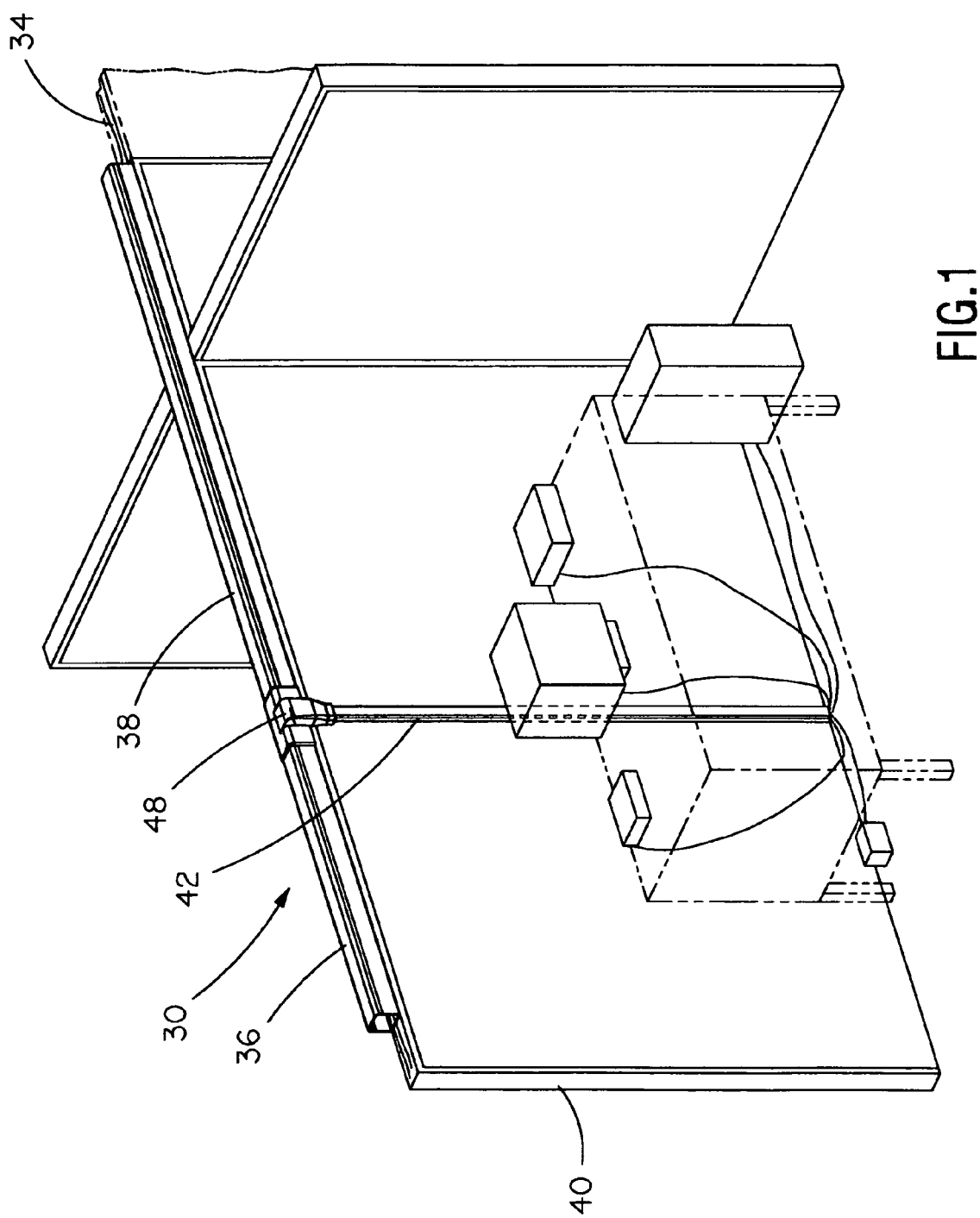
FIG. 1 is a fully assembled perspective view of a raceway system according to a first embodiment of the present invention.

FIG. 1 shows a fully assembled raceway system 30. The raceway system 30 allows communication cabling, such as cables 34, from a horizontal raceway, such as horizontal raceway section 36 and horizontal raceway section 38, to spill over the sides of the office furniture panels, such as office furniture panel 40, thus allowing the cables 34 to pass through a vertical raceway section, such as vertical raceway section 42, and terminate at the desk level into a communication box. As shown in FIG. 1, it is likewise contemplated that cables 34 may terminate at the floor level.

Figure 2:
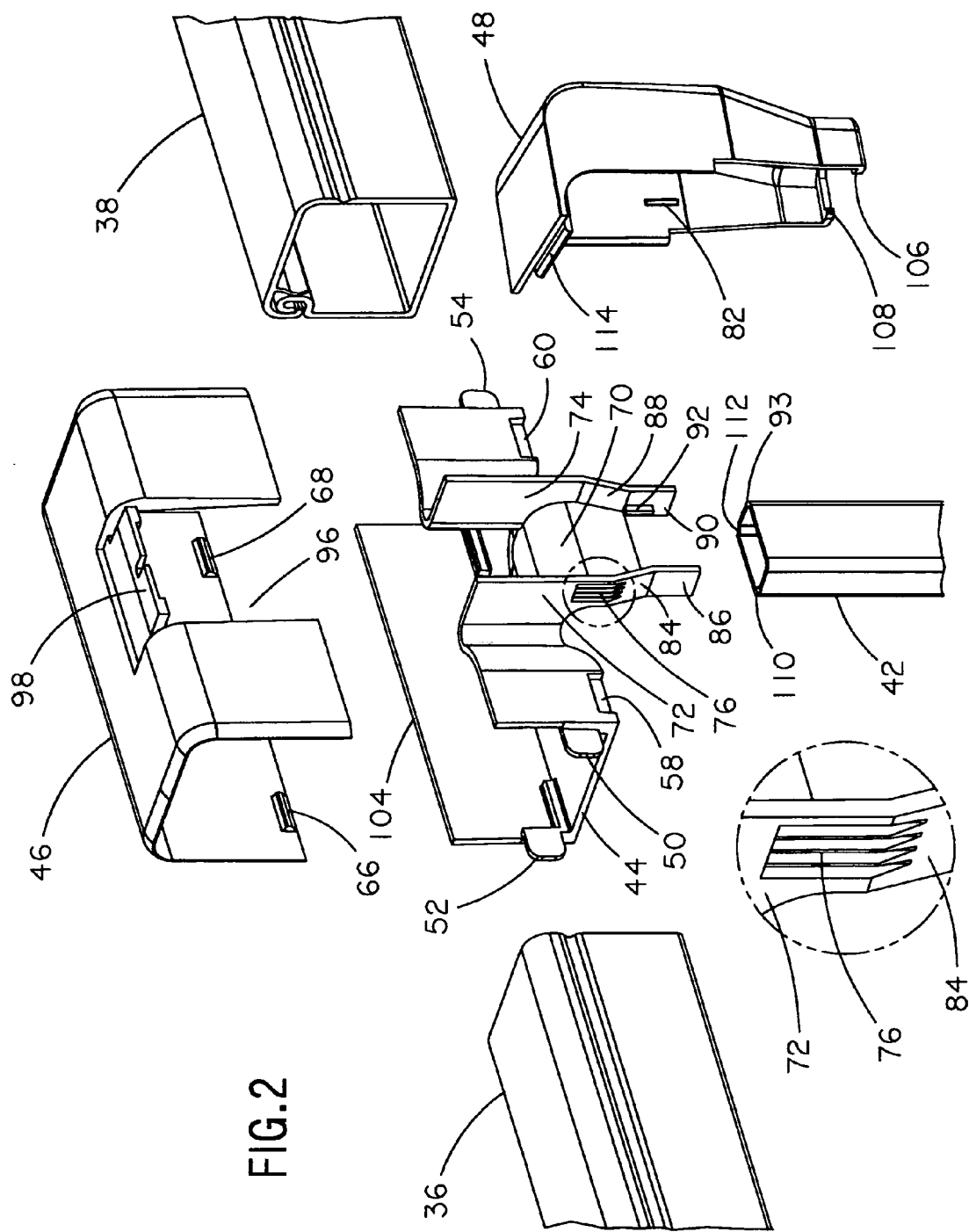
FIG. 2 is a fully exploded perspective view of the raceway system of FIG. 1.

As shown in FIG. 2, the raceway system 30 includes a base 44, a cover 46 securable to the base 44, a cover cap 48 securable to the base 44 and the cover 46, horizontal raceway sections 36, 38, and vertical raceway section 42. The base 44 is mounted to the top surface of the office furniture panel 40 via two-sided pressure sensitive tape. It is likewise contemplated that other means may be utilized to secure the base 44 to the top surface of the office furniture panel 40.

Figure 16:
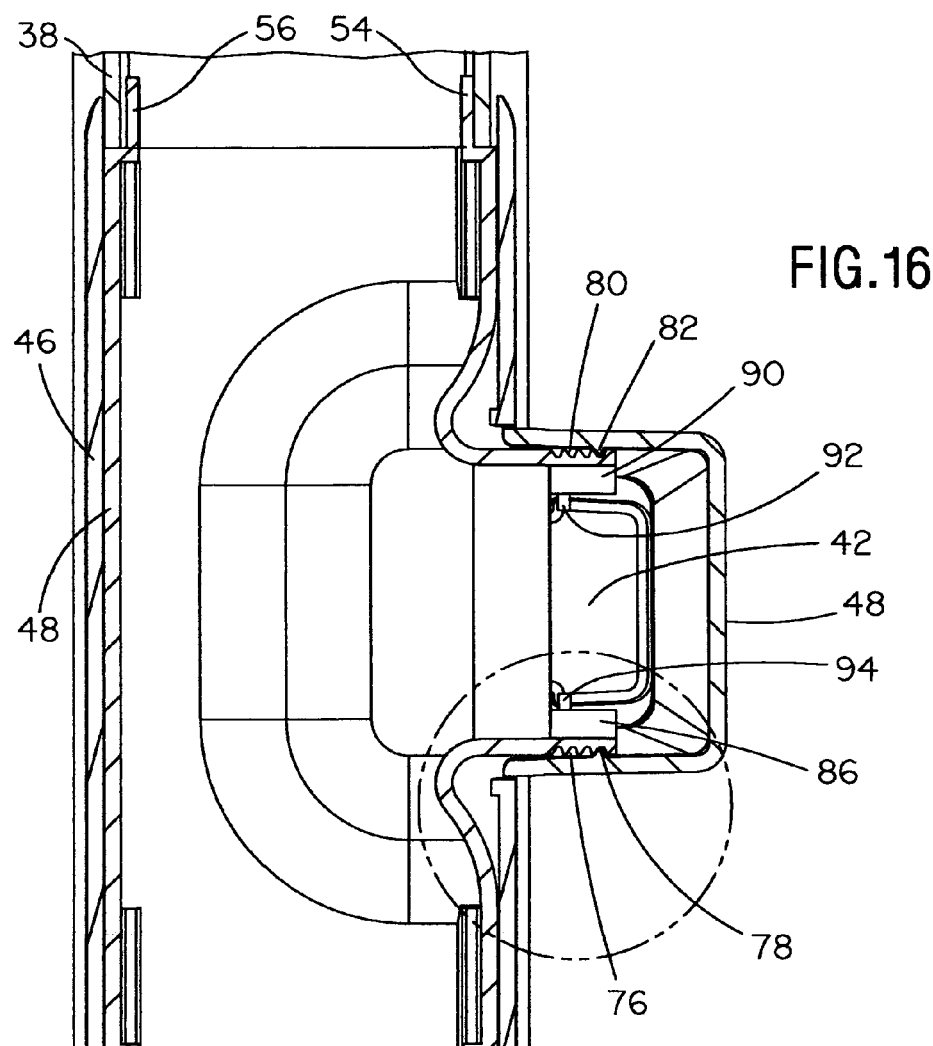
FIG. 16 is a cross-sectional view taken along lines 16—16 of FIG. 14, showing the cover cap secured in a second position.

As best seen in FIGS. 10 and 16, the base 44 has four flanges 50, 52, 54, 56 to allow for the proper alignment and attachment of the base 44 to the horizontal raceway sections 36, 38. Flanges 50, 52 fit to the inside walls of horizontal raceway section 36 to prevent any horizontal movement, and flanges 54, 56 fit to the inside walls of horizontal raceway section 38 to prevent any horizontal movement. The horizontal raceway sections 36, 38 are mounted to the top surface of the office furniture panel 40 via two-sided pressure sensitive tape. It is likewise contemplated that other means may be utilized to secure the horizontal raceway sections 36, 38 to the top surface of the office furniture panel 40.

Figure 3:
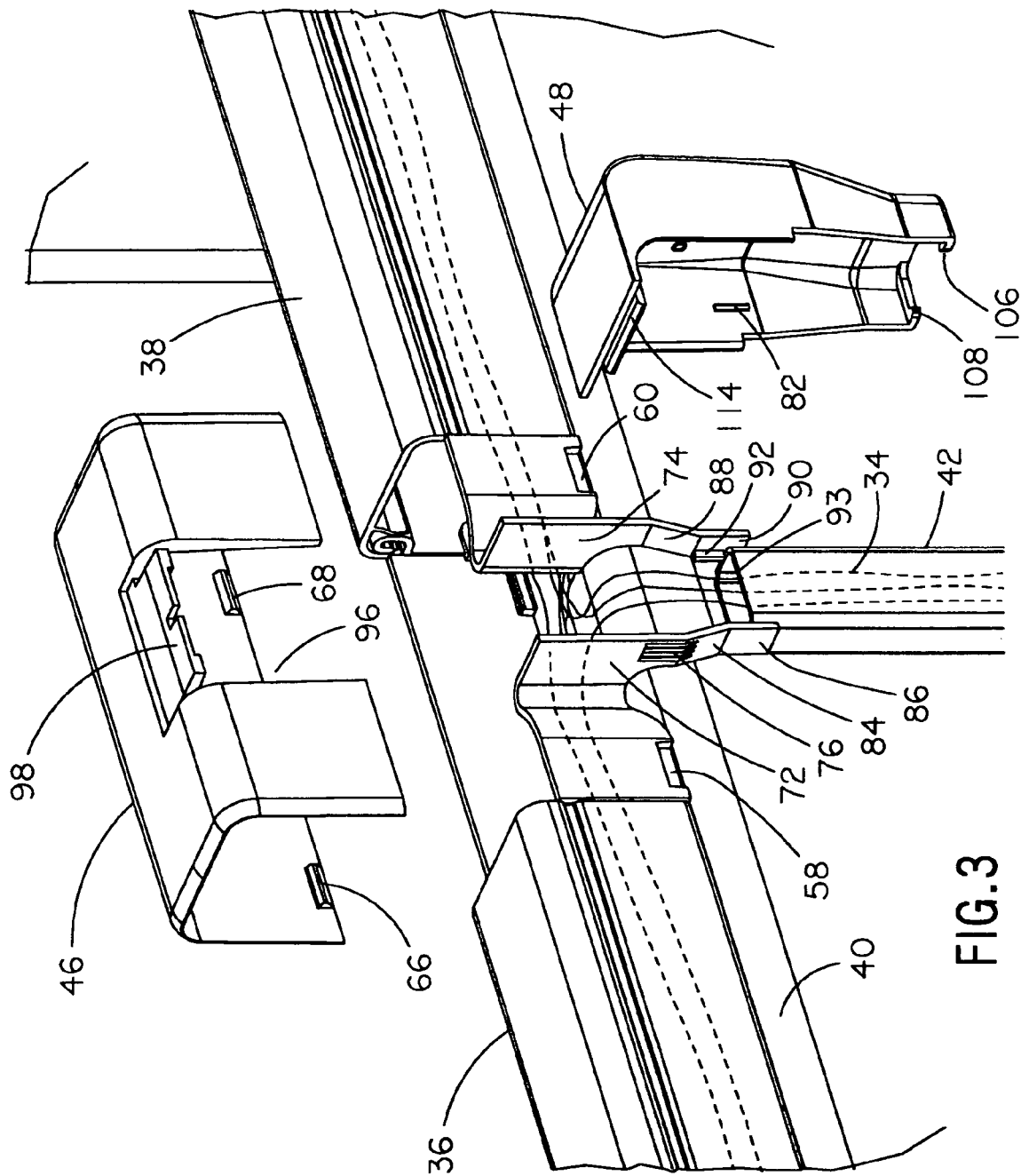
FIG. 3 is a partially exploded perspective view of the raceway system of FIG. 1.
Figure 6:
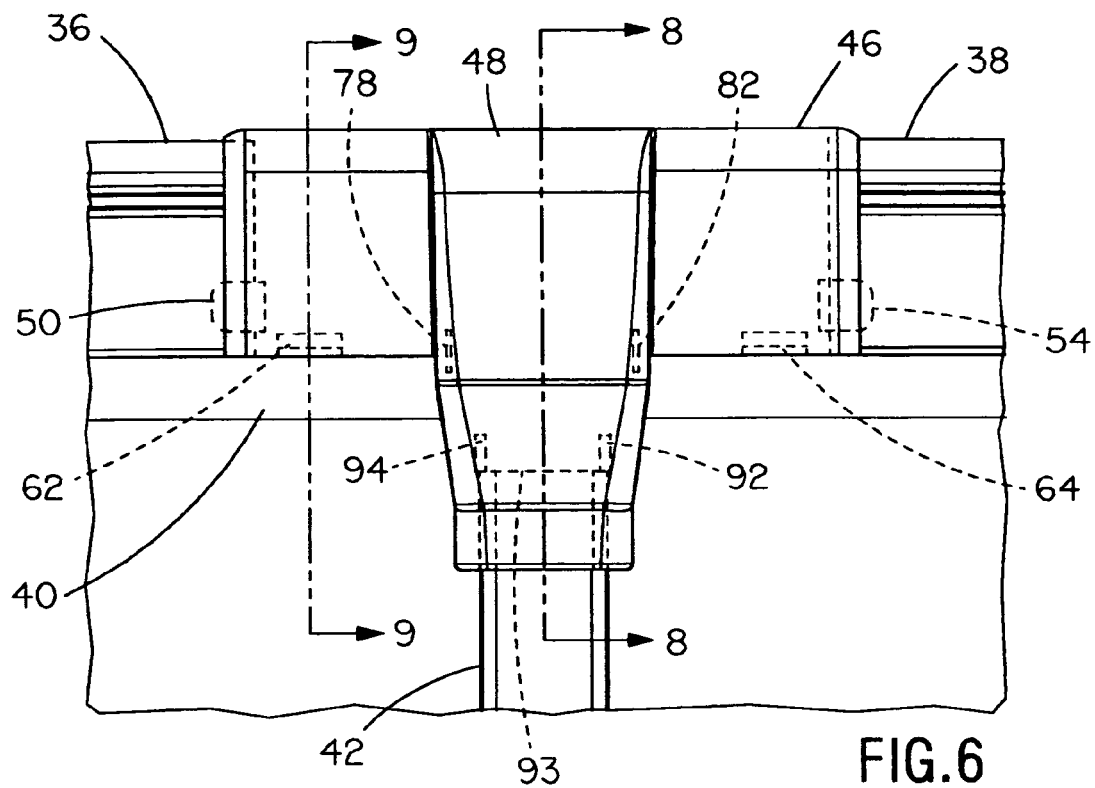
FIG. 6 is an enlarged front view of the raceway system of FIG. 1.
Figure 7:
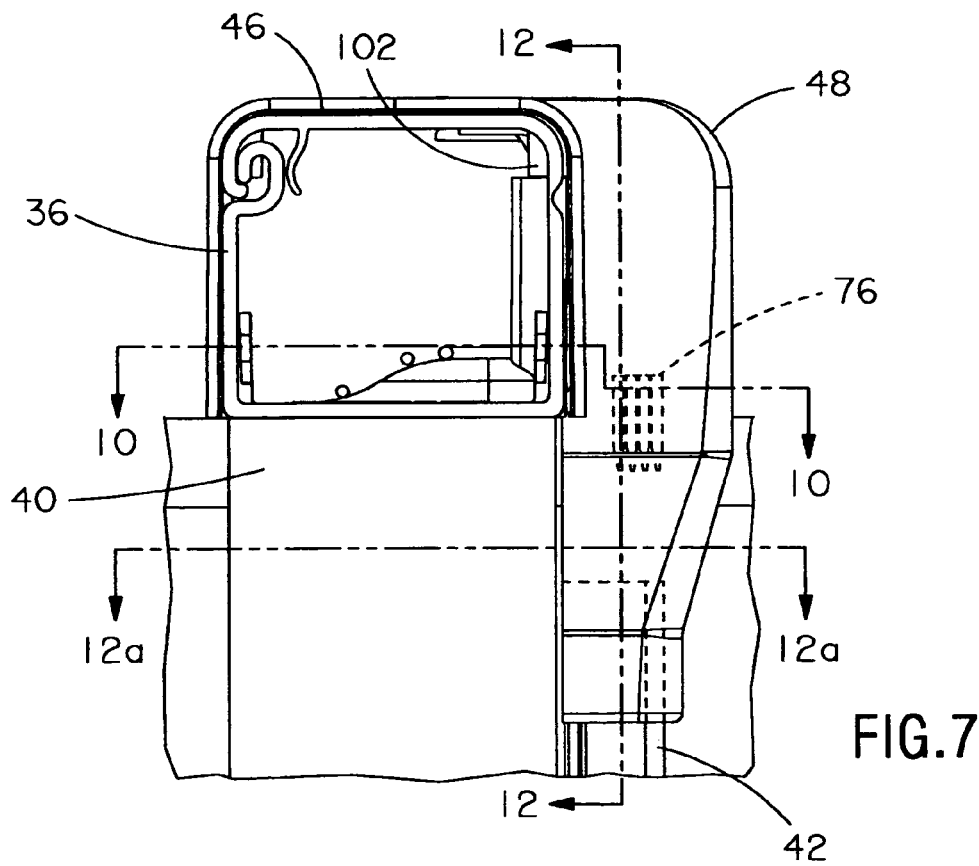
FIG. 7 is an enlarged left side view of the raceway system of FIG. 1.

As shown in FIGS. 2 and 3, the base includes two slots 58, 60 positioned on an outside surface of the front side thereof for receiving two latches 62, 64 (shown in phantom in FIG. 6) positioned on an inside surface of the front side of the cover 46 to secure the cover 46 therein. The rear side of the base 44 also includes two slots (not shown) for receiving two latches 66, 68 to secure the cover 46 therein. Moreover, the base 44 has a spillover side 70. As best seen in FIG. 8, the bottom wall surface of the base 44 radiuses upward and then downward again at the center of the spillover side 70, thus allowing for bend radius control. The spillover side 70 also contains radii to assist the cable bend radius control.

As shown in FIGS. 2–4, the spillover side 70 has two vertical walls 72, 74 for guiding cables 34 into the vertical raceway section 42. The vertical wall 72 has a plurality of grooves, such as groove 76, on an outside surface thereof for securing a latch 78 of the cover cap 48 at a plurality of predetermined positions. Likewise, the vertical wall 74 has a plurality of grooves, such as groove 80 (see FIGS. 10 and 16), on an outside surface thereof for securing a latch 82 of the cover cap 48 at a plurality of predetermined positions.

A tapered section 84 is adjacent the vertical wall 72, and the tapered section 84 narrows the width of the spillover side 70 from the vertical wall 72 to a side wall 86. Similarly, a tapered section 88 is adjacent the vertical wall 74, and the tapered section 88 narrows the width of the spillover side 70 from the vertical wall 74 to a side wall 90. The side walls 86, 90 form a channel having a width substantially equal to a width of the vertical raceway section 42.

The side wall 90 has a rib 92 on an inside surface thereof for engaging an end 93 of the vertical raceway section 42. Likewise, as shown in phantom in FIG. 6, the side wall 86 has a rib 94 on an inside surface thereof for engaging the end 93 of the vertical raceway section 42. The ribs 92, 94 act as stops for the vertical raceway section 42, thus positioning the vertical raceway section 42 in the proper location for ease of cable entry.

As shown in FIGS. 2–4, the cover 46 is securable to the base 44. Preferably, the cover 46 is U-shaped. However, it is likewise contemplated that the cover 46 may be various sizes and dimensions. Preferably, the cover 46 has a length greater than the length of the base 44 to hide any rough-cuts of the horizontal raceway sections 36, 38 that abut the base 44. However, it is likewise contemplated that the cover 46 may have a length less than or equal to the length of the base 44.

As shown in FIGS. 2 and 3, the cover has an opening 96 on a side wall thereof to allow for clearance of the vertical walls 72, 74 of the spillover side 70, and the cover 46 includes a shelf 98 extending towards the side wall. Moreover, as best seen in FIGS. 8 and 9, the cover 46 includes ribs 100, 102 on an inside surface thereof for engaging a top surface 104 of the base 44 to ensure positive locking. The ribs 100, 102 stop against the top surface 104 to prevent the cover 46 from falling inward when the horizontal raceway sections 36, 38 are not in place.

Figure 17:
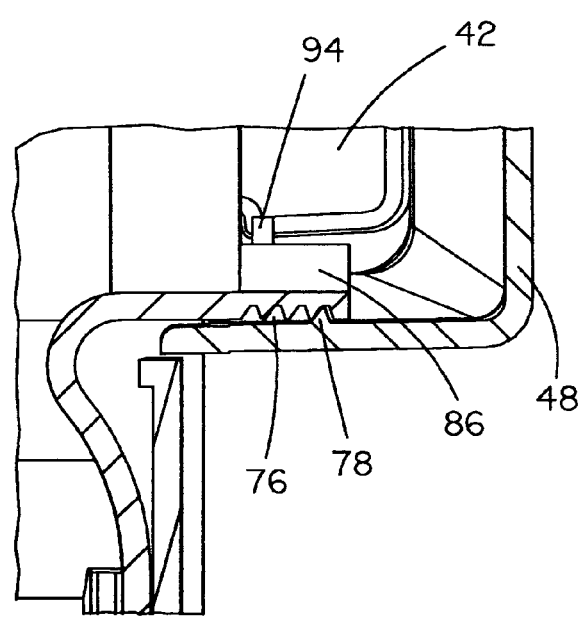
FIG. 17 is an enlarged view of a section of FIG. 16.

As best seen in FIGS. 10 and 16, the cover cap 48 has two latches 78, 82 on an inside surface thereof for securing the cover cap 48 to the base 44 in a plurality of predetermined positions, and the cover cap 48 is adjustable between the plurality of predetermined positions. As shown in FIGS. 10 and 11, the cover cap 48 is secured to the base 44 in a first position, which accommodates an office furniture panel having a lesser width. Alternatively, as shown in FIGS. 16 and 17, the cover cap 48 is secured to the base 44 in a second position, which accommodates an office furniture panel having a greater width. It is likewise contemplated that the cover cap 48 may be secured to the base 44 in either of the other two predetermined positions illustrated in FIGS. 11 and 17.

Figure 12:
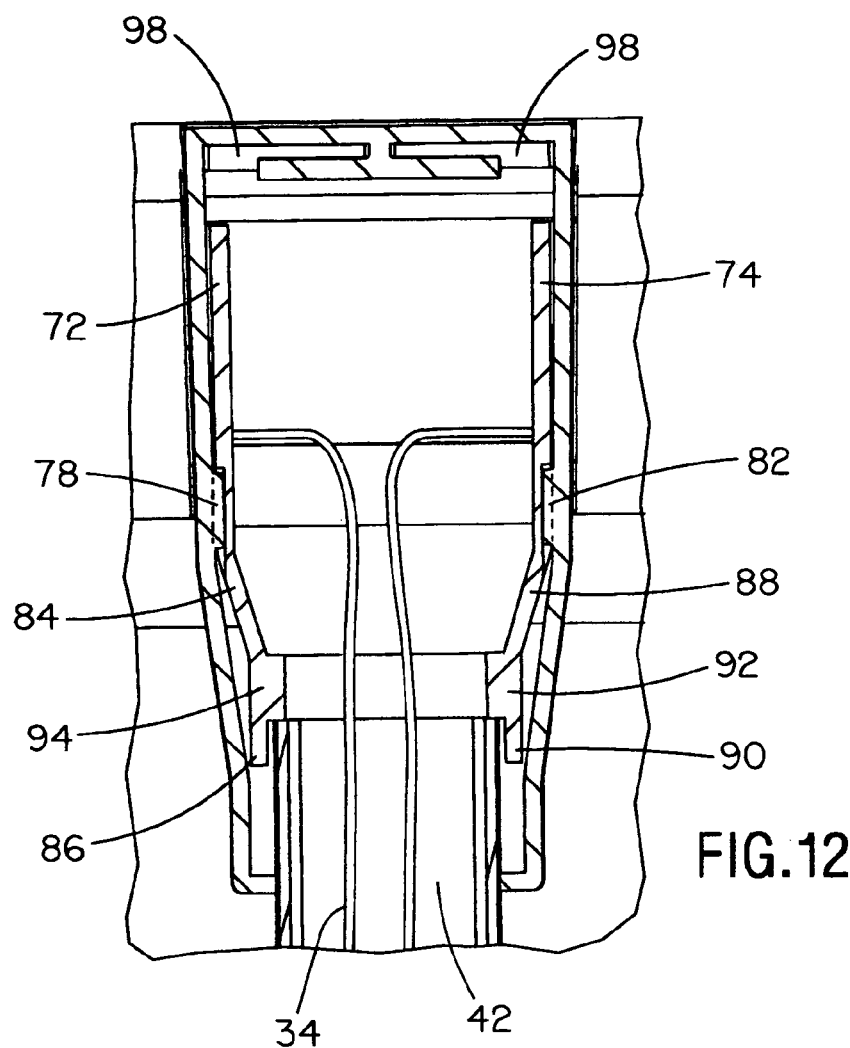
FIG. 12 is a cross-sectional view taken along lines 12—12 of FIG. 7.
Figure 12A:
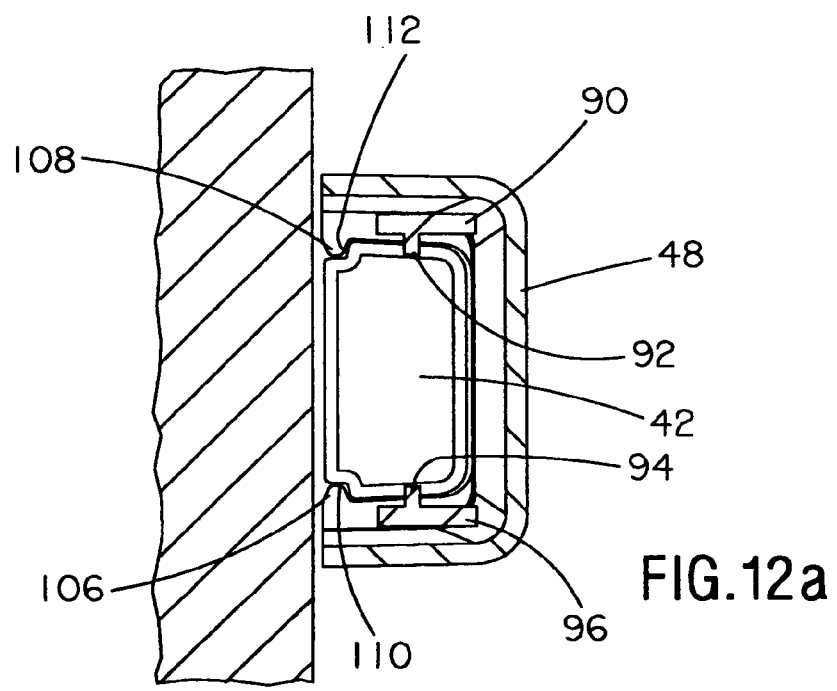
FIG. 12A is a cross-sectional view taken along lines 12A—12A of FIG. 7.
Figure 13:
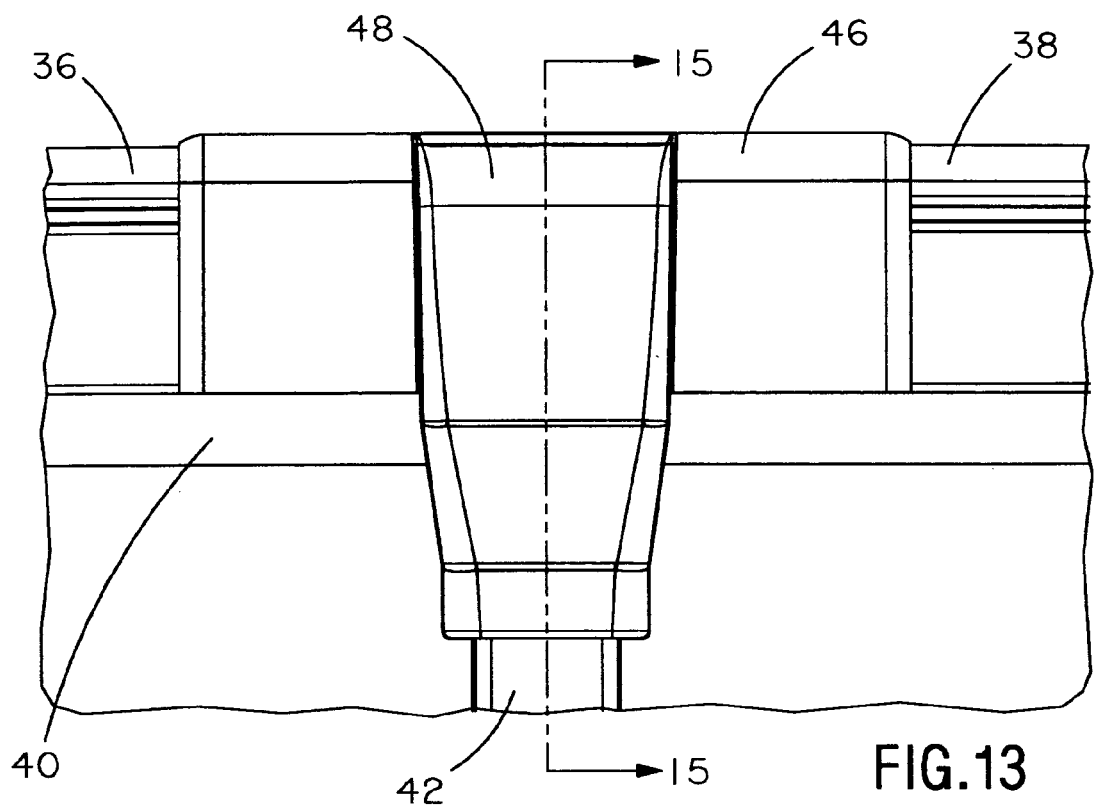
FIG. 13 is an enlarged front view of the raceway system of FIG. 1.
Figure 14:
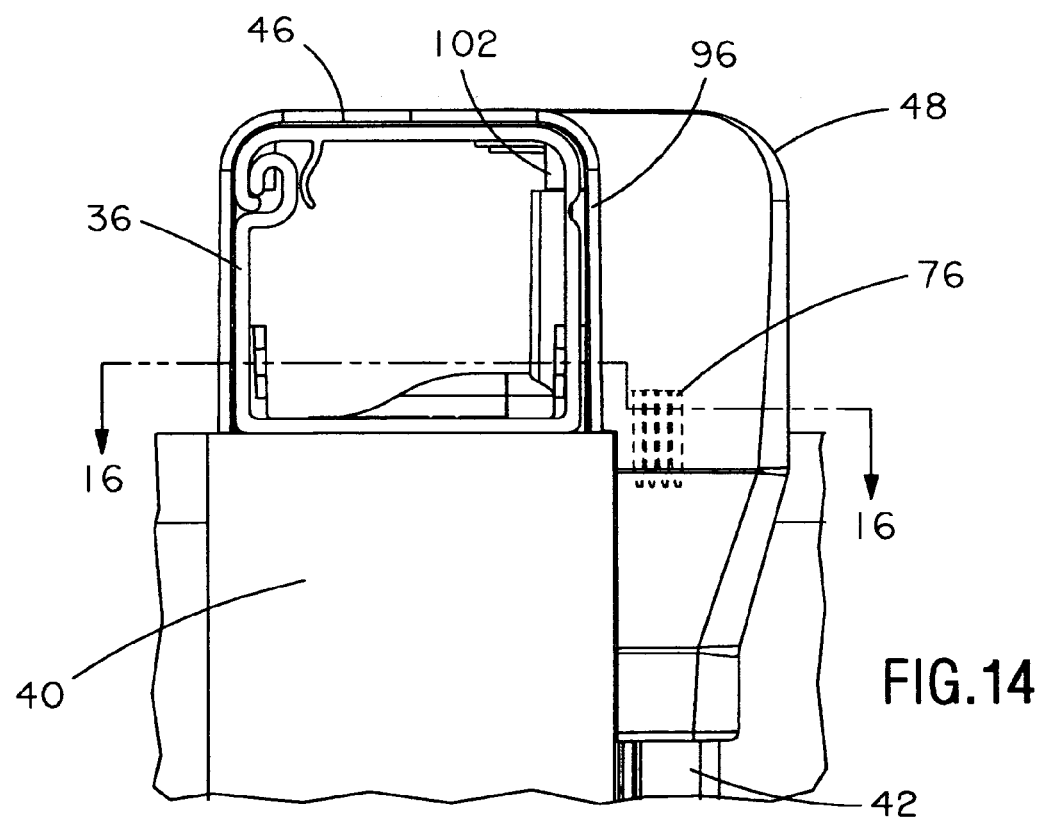
FIG. 14 is an enlarged left side view of the raceway system of FIG. 1.
Figure 15:
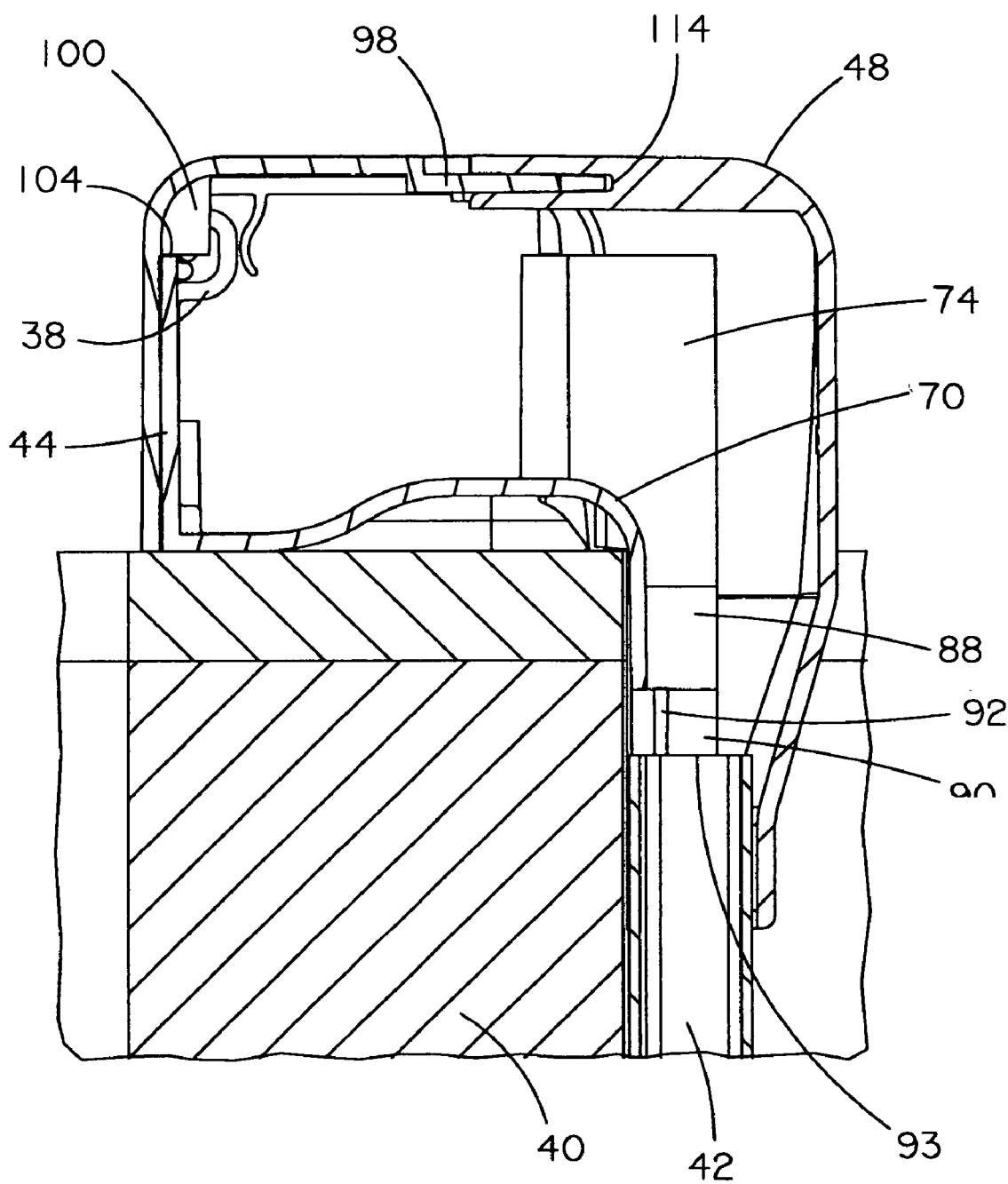
FIG. 15 is a cross-sectional view taken along lines 15—15 of FIG. 13.

As best seen in FIG. 12A, the cover cap 48 has two latches 106, 108 for locking under two raceway notches 110, 112, respectively, to retain the vertical raceway section 42 therein. As shown in FIG. 4, the cover cap 48 fits into the opening 96 on the side wall of the cover 46 to enclose the opening 96. As the cover cap 48 engages the cover 46, the shelf 98 mates with a groove 114 to ensure a secure assembly with proper alignment, as best seen in FIGS. 8 and 15. Moreover, as the cover cap 48 engages the base 44, the latches 78, 82 engage the grooves 76, 80, respectively, to retain the cover cap 48 thereon and allow for the adjustment of the cover cap 48 to accommodate different size panel widths.

In operation, the base 44 is centered within and attached to the top surface of the office furniture panel 40 with two-sided pressure sensitive tape. The horizontal raceway sections 36, 38 are also centered within and attached to the top surface of the office furniture panel 40 with two-sided pressure sensitive tape, and receive the flanges 50, 52, 54, 56 to align the horizontal raceway sections 36, 38. Cables 34 are then routed from one or both of the horizontal raceway sections 36, 38 into the base 44 and around the radius wall and down the spillover side 70, as shown in FIG. 3. The cover 46 is then fitted over the base 44 and the horizontal raceway sections 36, 38, while the latches 62, 64, 66, 68 of the cover 46 snap-lock the cover 46 to the base 44.

As shown in FIG. 4, the vertical raceway section 42 is positioned below the spillover side 70, with the end 93 of the vertical raceway section 42 abutting the ribs 92, 94. Cables 34 are then routed into the vertical raceway section 42. Finally, the cover cap 48 is fitted and locked into the cover 46 and the base 44 once the groove 114 receives the shelf 98 and the latches 78, 82 snap-lock into the grooves 76, 80, respectively, of the base 44, while the latches 106, 108 engage the notches 110, 112, respectively, to retain the vertical raceway section 42 therein.

Figure 18:
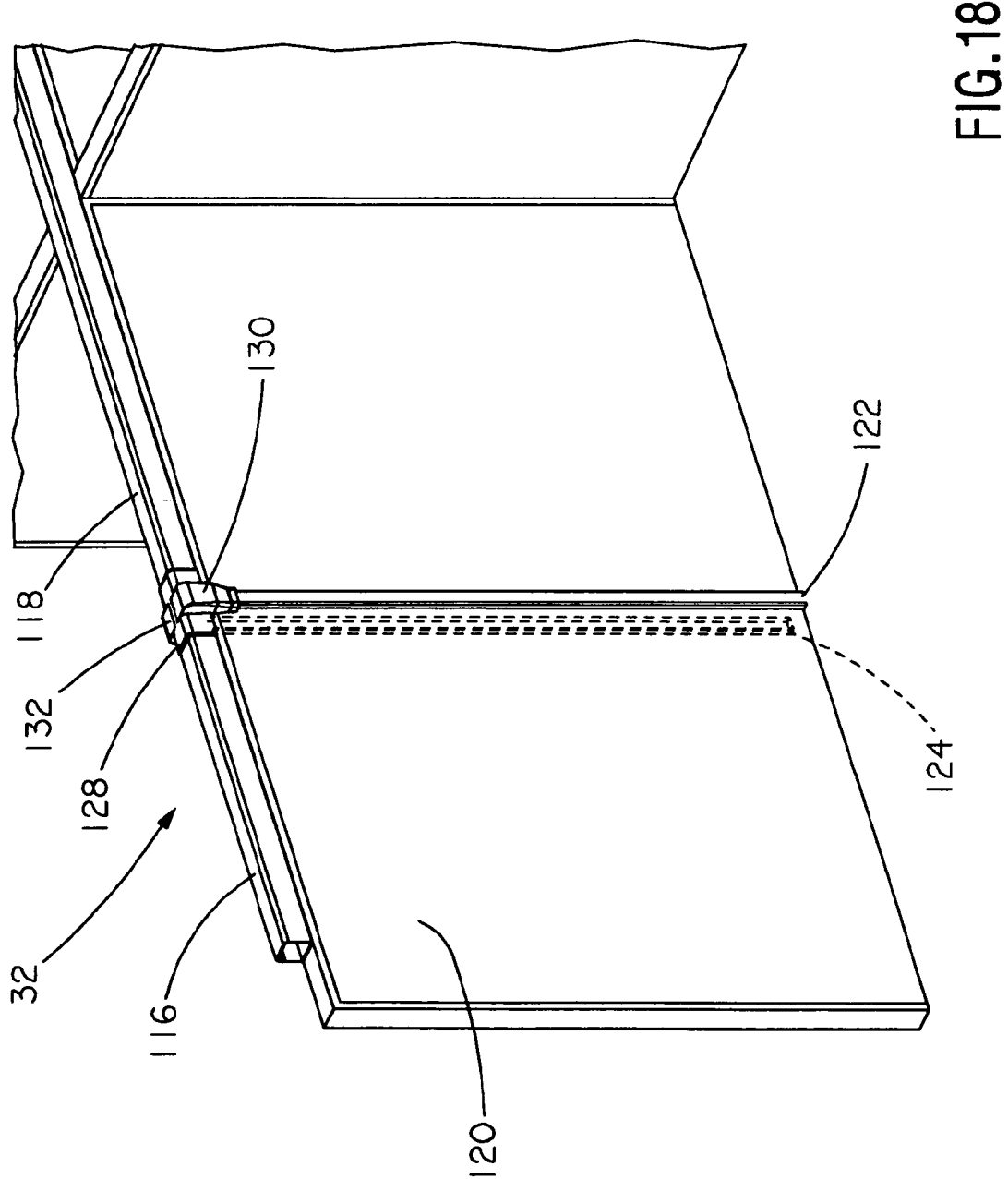
FIG. 18 is a fully assembled perspective view of a raceway system according to a second embodiment of the present invention.

FIG. 18 shows a fully assembled raceway system 32. The raceway system 32 allows communication cabling, such as cables 34 shown in FIG. 1, from a horizontal raceway, such as horizontal raceway section 116 and horizontal raceway section 118, to spill over the sides of the office furniture panels, such as office furniture panel 120, thus allowing the cables 34 to pass through a vertical raceway section, such as first vertical raceway section 122 and second vertical raceway section 124, and terminate at the desk level into a communication box. As shown in FIG. 18, it is likewise contemplated that cables 34 may terminate at the floor level.

Figure 19:
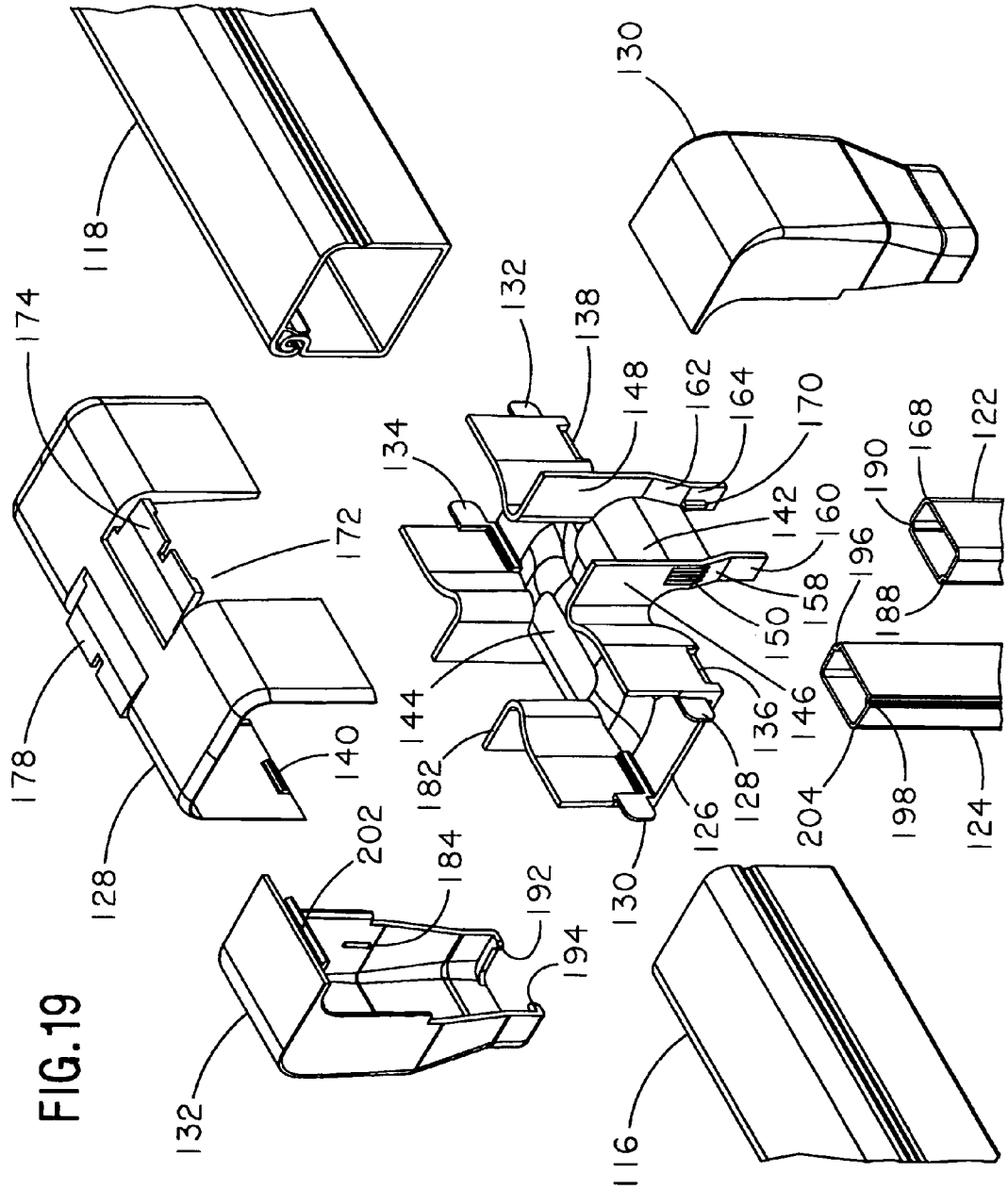
FIG. 19 is a fully exploded perspective view of the raceway system of FIG. 18.

As shown in FIG. 19, the raceway system 32 includes a base 126, a cover 128 securable to the base 126, a first cover cap 130 securable to the base 126 and the cover 128, a second cover cap 132 securable to the base 126 and the cover 128, horizontal raceway sections 116, 118, and vertical raceway sections 122, 124. The base 126 is mounted to the top surface of the office furniture panel 120 via two-sided pressure sensitive tape. It is likewise contemplated that other means may be utilized to secure the base 126 to the top surface of the office furniture panel 120.

Figure 25:
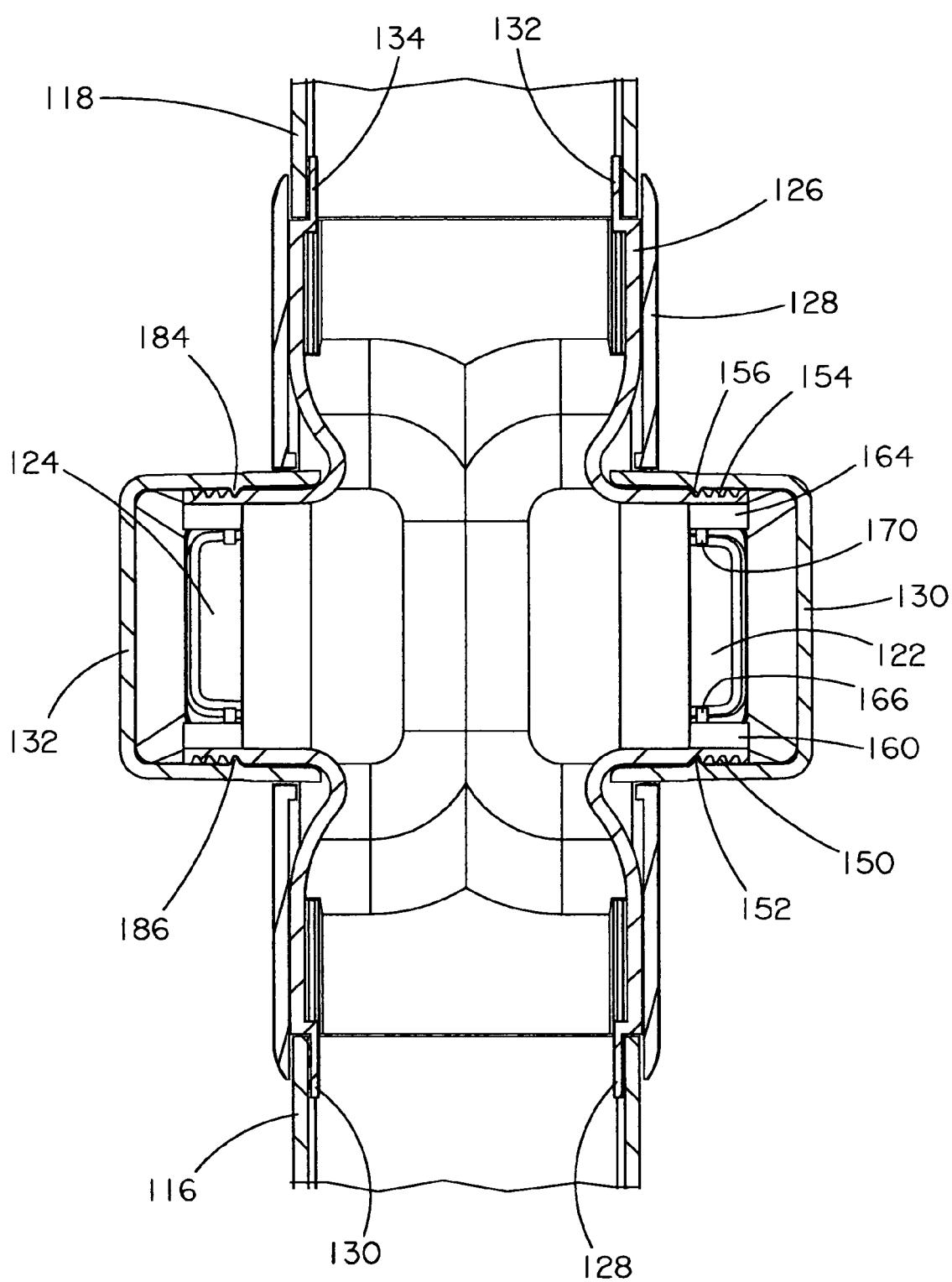
FIG. 25 is a cross-sectional view taken along lines 25—25 of FIG. 23, showing each cover-cap secured in a first position.
Figure 28:
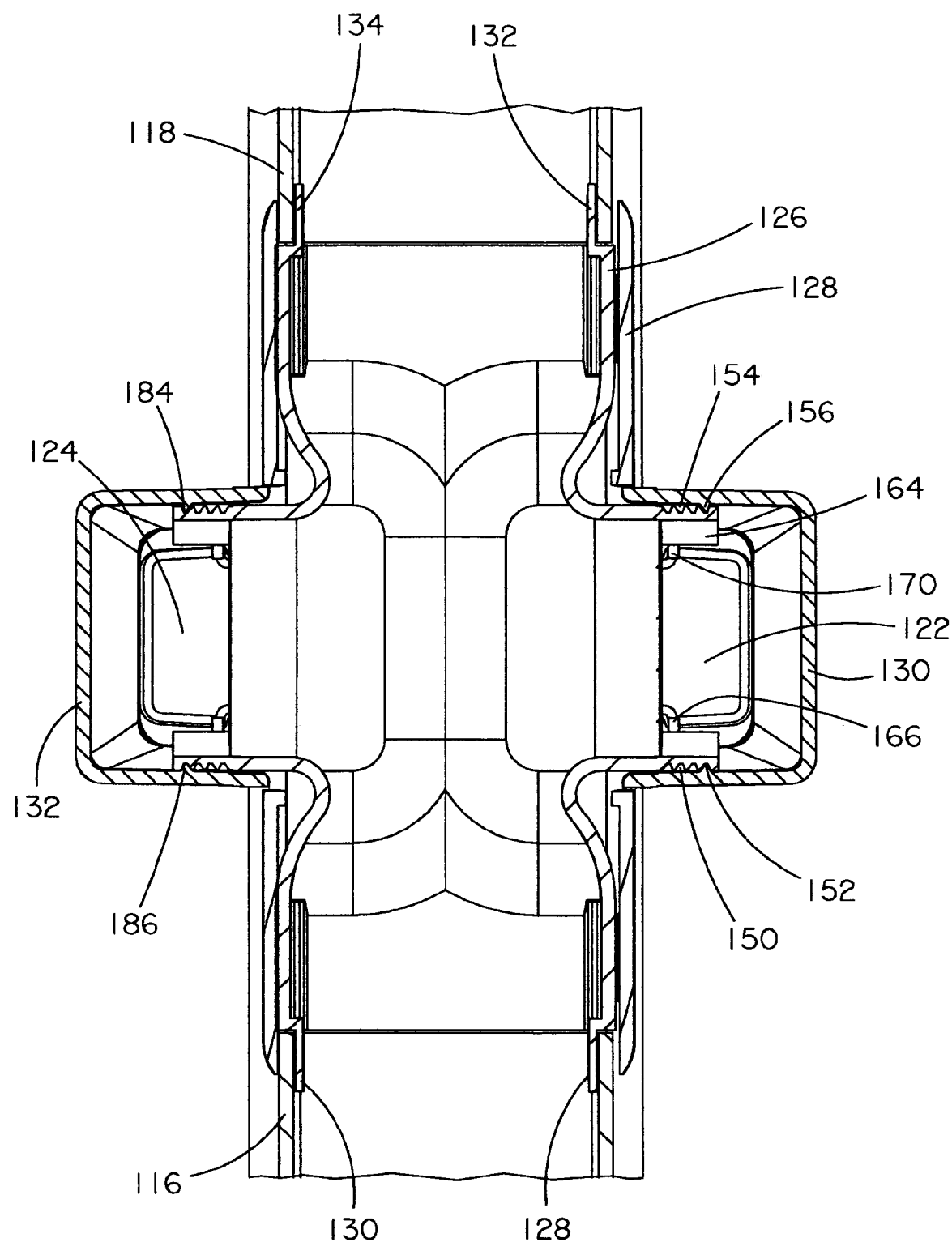
FIG. 28 is a cross-sectional view taken along lines 28—28 of FIG. 26, showing each cover cap secured in a second position.

As best seen in FIGS. 25 and 28, the base 126 has four flanges 128, 130, 132, 134 to allow for the proper alignment and attachment of the base 126 to the horizontal raceway sections 116, 118. Flanges 128, 130 fit to the inside walls of horizontal raceway section 116 to prevent any horizontal movement, and flanges 132, 134 fit to the inside walls of horizontal raceway section 118 to prevent any horizontal movement. The horizontal raceway sections 116, 118 are mounted to the top surface of the office furniture panel 120 via two-sided pressure sensitive tape. It is likewise contemplated that other means may be utilized to secure the horizontal raceway sections 116, 118 to the top surface of the office furniture panel 120.

Figure 20:
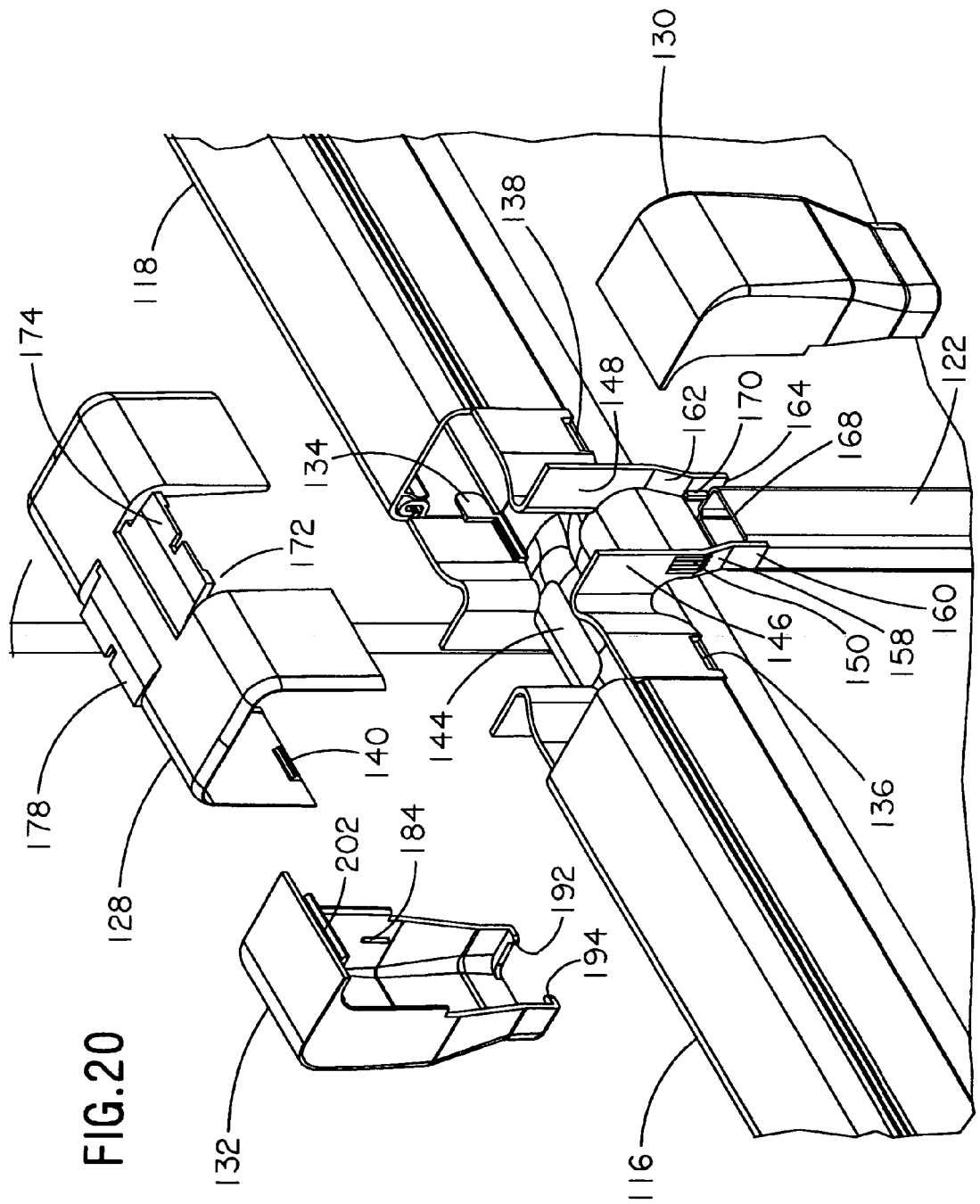
FIG. 20 is a partially exploded perspective view of the raceway system of FIG. 18.
Figure 24:
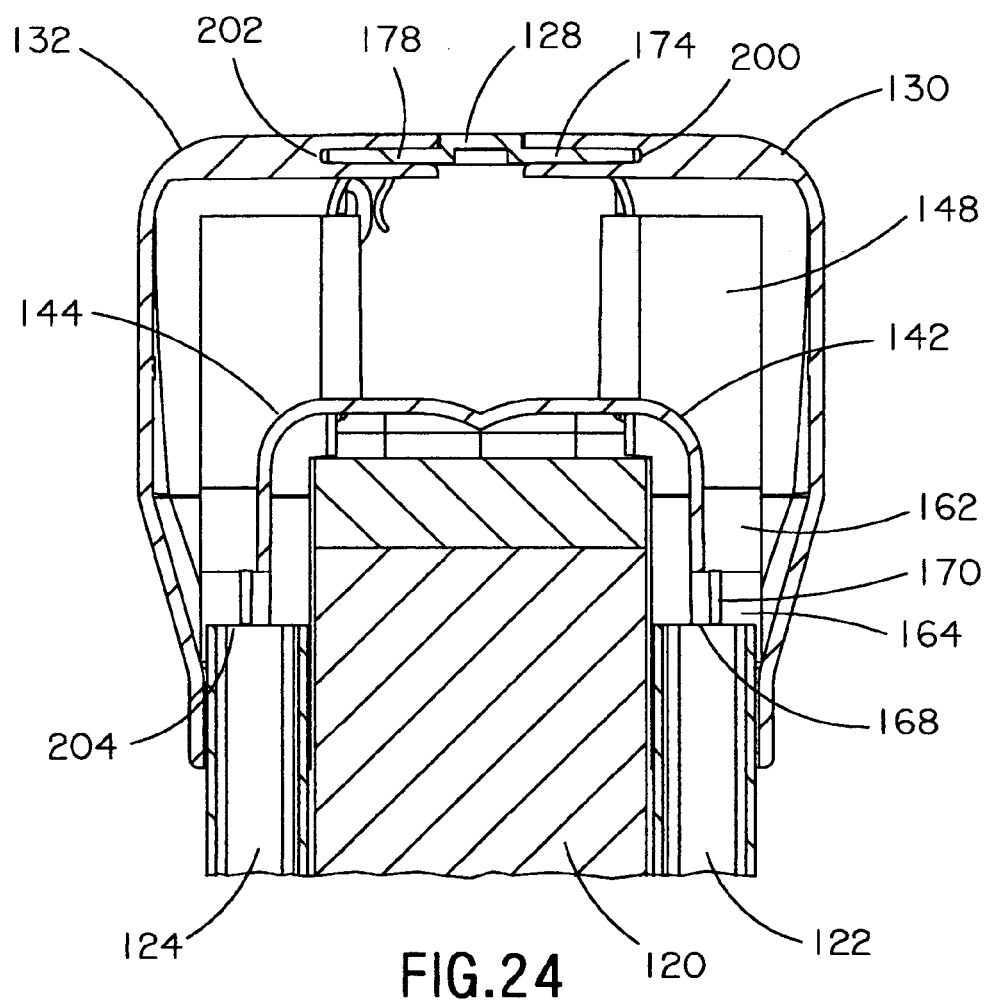
FIG. 24 is a cross-sectional view taken along lines 24—24 of FIG. 22.

As shown in FIGS. 19 and 20, the base 126 includes two slots 136, 138 positioned on an outside surface of the front side thereof for receiving two latches (not shown) positioned on an inside surface of the front side of the cover 128 to secure the cover 128 therein. The rear side of the base 126 also includes two slots (not shown) for receiving a latch 140 and a latch (not shown) to secure the cover 128 therein. Moreover, the base 126 has a first spillover side 142 and a second spillover side 144. As best seen in FIG. 24, the bottom wall surface of the base 126 radiuses upward and then downward again at the centers of the first spillover side 142 and the second spillover side 144, respectively, thus allowing for bend radius control. Each of the first spillover side 142 and the second spillover side 144 also contains radii to assist the cable bend radius control.

Figure 21:
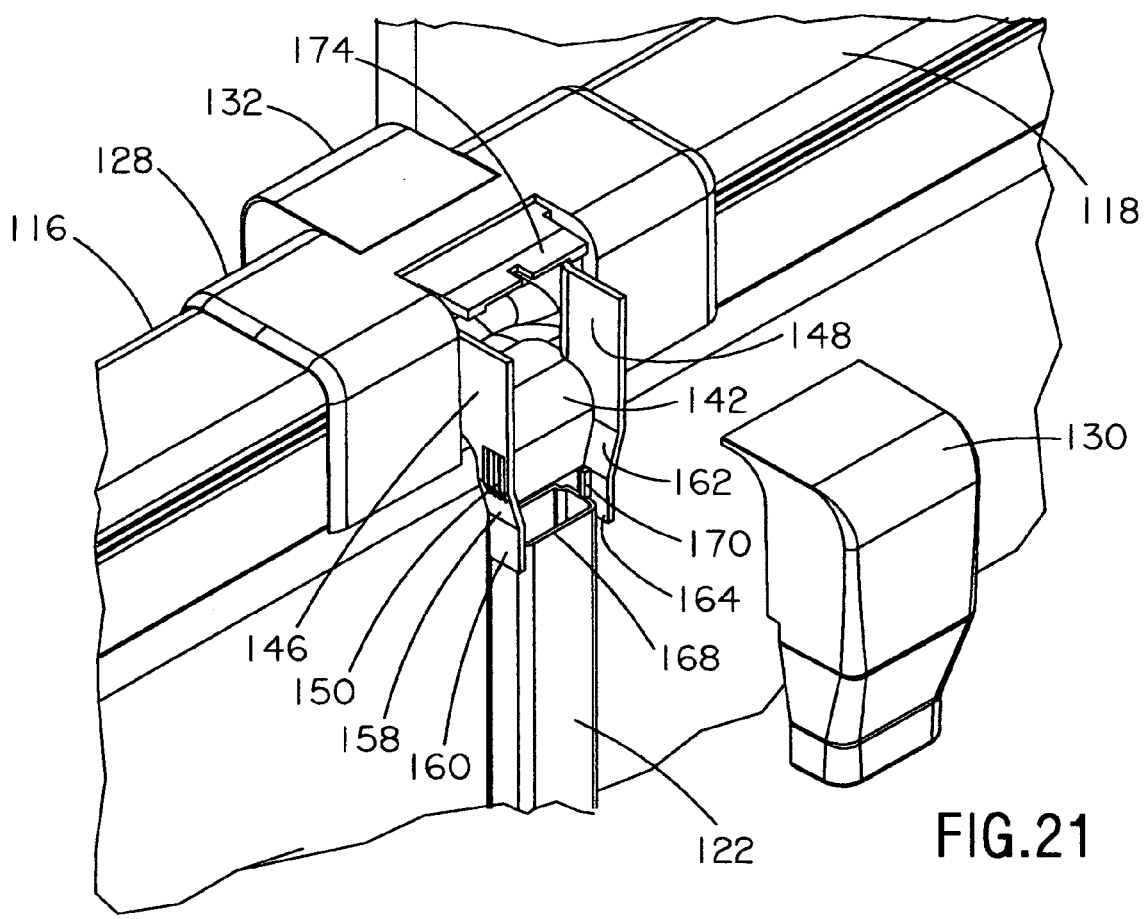
FIG. 21 is a partially exploded perspective view of the raceway system of FIG. 18.
Figure 22:
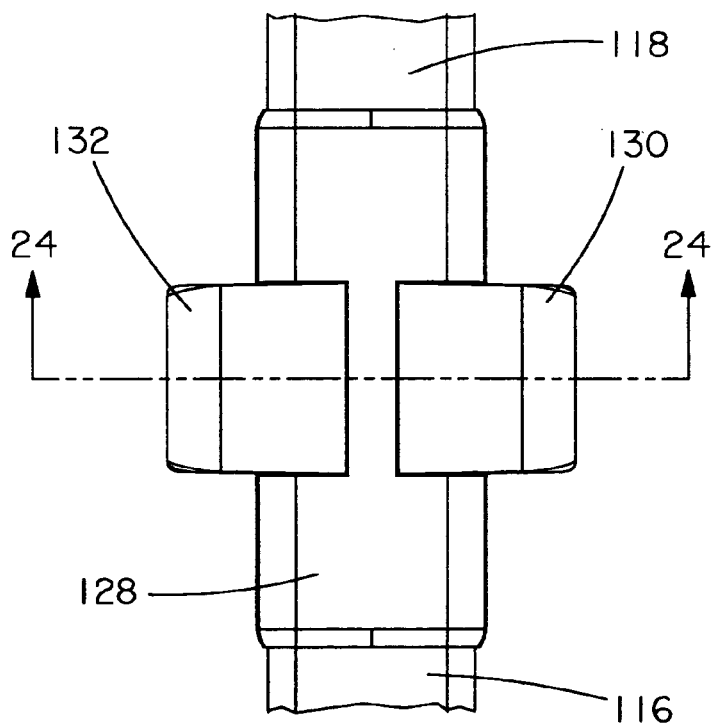
FIG. 22 is an enlarged top view of the raceway system of FIG. 18.

As shown in FIGS. 19–21, the first spillover side 142 has two vertical walls 146, 148 for guiding cables 34 into the first vertical raceway section 122. The vertical wall 146 has a plurality of grooves, such as groove 150, on an outside surface thereof for securing a latch 152 of the first cover cap 130 at a first plurality of predetermined positions. Likewise, the vertical wall 148 has a plurality of grooves, such as groove 154 (see FIGS. 25 and 28), on an outside surface thereof for securing a latch 156 of the first cover cap 130 at a first plurality of predetermined positions.

A tapered section 158 is adjacent the vertical wall 146, and the tapered section 158 narrows the width of the first spillover side 142 from the vertical wall 146 to a side wall 160. Similarly, a tapered section 162 is adjacent the vertical wall 148, and the tapered section 162 narrows the width of the first spillover side 142 from the vertical wall 148 to a side wall 164. The side walls 160, 164 form a channel having a width substantially equal to a width of the first vertical raceway section 122.

As best seen in FIGS. 25 and 28, the side wall 160 has a rib 166 on an inside surface thereof for engaging an end 168 of the first vertical raceway section 122. Likewise, the side wall 164 has a rib 170 on an inside surface thereof for engaging the end 168 of the first vertical raceway section 122. The ribs 166, 168 act as stops for the first vertical raceway section 122, thus positioning the first vertical raceway section 122 in the proper location for ease of cable entry.

Preferably, the second spillover side 144 is substantially identical to the first spillover side 142. Accordingly, the second spillover side 144 functions in a substantially identical manner to the first spillover side 142.

As shown in FIGS. 19–21, the cover 128 is securable to the base 126. Preferably, the cover 128 is U-shaped. However, it is likewise contemplated that the cover 128 may be various sizes and dimensions. Preferably, the cover 128 has a length greater than the length of the base 126 to hide any rough-cuts of the horizontal raceway sections 116, 118 that abut the base 126. However, it is likewise contemplated that the cover 128 may have a length less than or equal to the length of the base 126.

Figure 23:
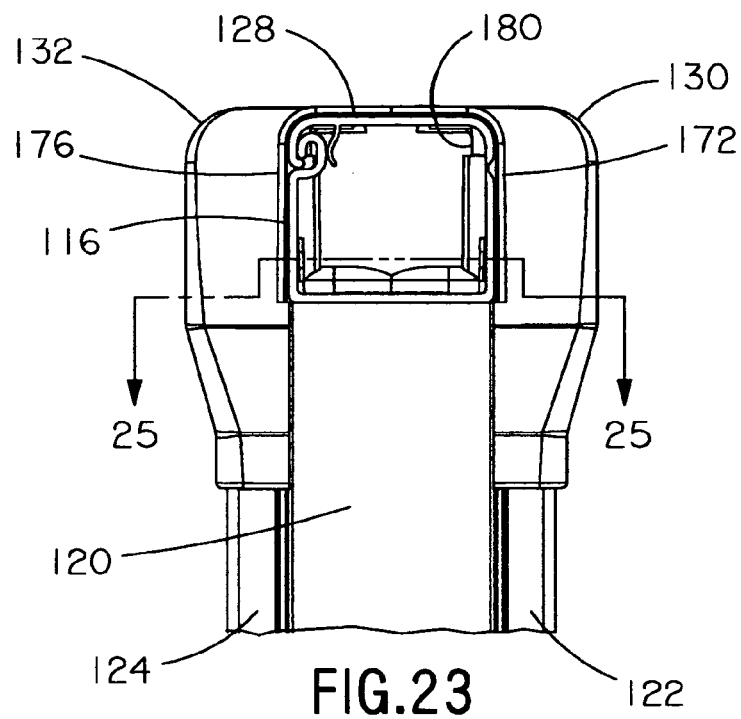
FIG. 23 is an enlarged left side view of the raceway system of FIG. 18.
Figure 26:
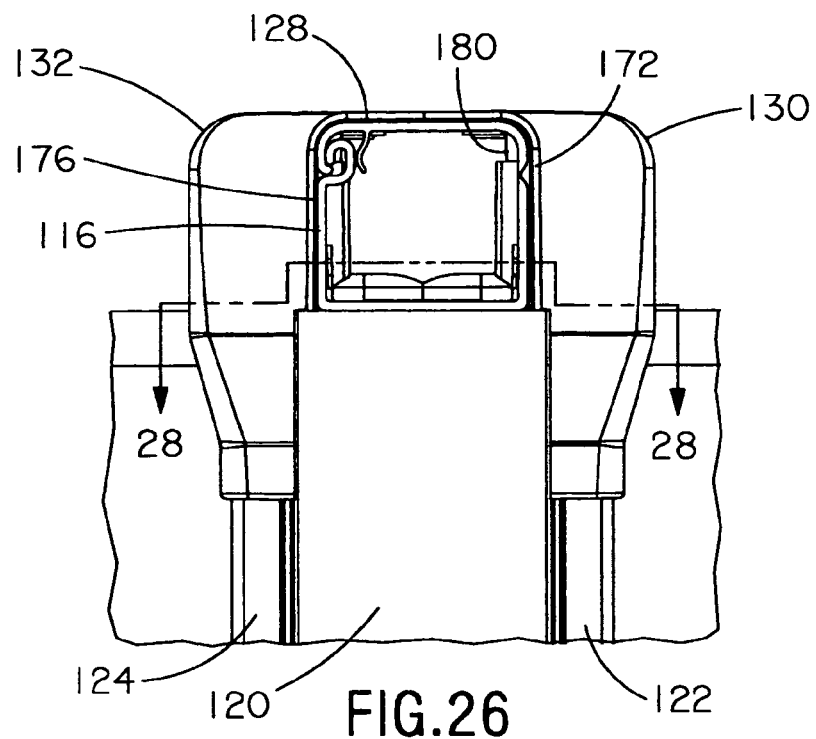
FIG. 26 is an enlarged left side view of the raceway system of FIG. 18.

As shown in FIGS. 19 and 20, the cover 128 has a first opening 172 on a first side wall thereof to allow for clearance of the vertical walls 146, 148 of the first spillover side 142, and the cover 128 includes a first shelf 174 extending toward the first side wall. Similarly, the cover 128 has a second opening 176 (see FIG. 23) on a second side wall thereof to allow for clearance of the vertical walls of the second spillover side 144, and the cover 128 includes a second shelf 178 extending towards the second side wall. Moreover, as best seen in FIGS. 23 and 26, the cover 128 includes at least one rib, such as rib 180, on an inside surface thereof for engaging a top surface 182 of the base 126 to ensure positive locking. The rib 180 stops against the top surface 182 to prevent the cover 128 from falling inward when the horizontal raceway sections 116, 118 are not in place.

As shown in FIGS. 25 and 28, the first cover cap 130 has two latches 152, 156 on an inside surface thereof for securing the first cover cap 130 to the base 126 in a first plurality of predetermined positions, and the first cover cap 130 is adjustable between the first plurality of predetermined positions. As shown in FIG. 25, the first cover cap 130 is secured to the base 126 in a first position, which accommodates an office furniture panel having a lesser width. Similarly, the second cover cap 132 has two latches 184, 186 on an inside surface thereof for securing the second cover cap 132 to the base 126 in a second plurality of predetermined positions, and the second cover cap 132 is adjustable between the second plurality of predetermined positions. As shown in FIG. 25, the second cover cap 132 is secured to the base 126 in a first position, which accommodates an office furniture panel having a lesser width.

Alternatively, as shown in FIG. 28, the first cover cap 130 is secured to the base 126 in a second position, which accommodates an office furniture panel having a greater width. It is likewise contemplated that the first cover cap 130 may be secured to the base 126 in either of the other two predetermined positions illustrated in FIGS. 25 and 28. Likewise, as shown in FIG. 28, the second cover cap 132 is secured to the base 126 in a second position, which accommodates an office furniture panel having a greater width. It is likewise contemplated that the second cover cap 132 may be secured to the base 126 in either of the other two predetermined positions illustrated in FIGS. 25 and 28.

The first cover cap 130 has two latches (not shown) for locking under two raceway notches 188, 190 (see FIG. 19), respectively, to retain the first vertical raceway section 122 therein. Likewise, as best seen in FIG. 19, the second cover cap 132 has two latches 192, 194 for locking under two raceway notches 196, 198, respectively, to retain the second vertical raceway section 124 therein.

As shown in FIG. 23, the first cover cap 130 fits into the first opening 172 on the first side of the cover 128 to enclose the first opening 172, and the second cover cap 132 fits into the second opening 176 on the second side of the cover 128 to enclose the second opening 176. As the first cover cap 130 engages the cover 128, the first shelf 174 mates with a first groove 200 to ensure a secure assembly with proper alignment, as best seen in FIG. 24. Likewise, as the second cover cap 132 engages the cover 128, the second shelf 178 mates with a second groove 202 to ensure a secure assembly with proper alignment. Moreover, as the first cover cap 130 engages the base 126, the latches 152, 156 engage the grooves 150, 154, respectively, to retain the first cover cap 130 thereon and allow for the adjustment of the first cover cap 130 to accommodate different size panel widths. Similarly, as the second cover cap 132 engages the base 126, the latches 184, 186 engage the grooves to retain the second cover cap 132 thereon and allow for the adjustment of the second cover cap 132 to accommodate different size panel widths.

In operation, the base 126 is centered within and attached to the top of the office furniture panel 120 with two-sided pressure sensitive tape. The horizontal raceway sections 116, 118 are also centered within and attached to the top surface of the office furniture panel 120 with two-sided pressure sensitive tape, and receive the flanges 128, 130, 132, 134 to align the horizontal raceway sections 116, 118. Cables 34 are then routed from one or both of the horizontal raceway sections 116, 118 into the base 126 and around the radius walls and down into one or both of the first spillover side 142 and the second spillover side 144. The cover 128 is then fitted over the base 126 and the horizontal raceway sections 116, 118, while the latches of the cover 128 snap-lock the cover 128 to the base 126.

Figure 27:
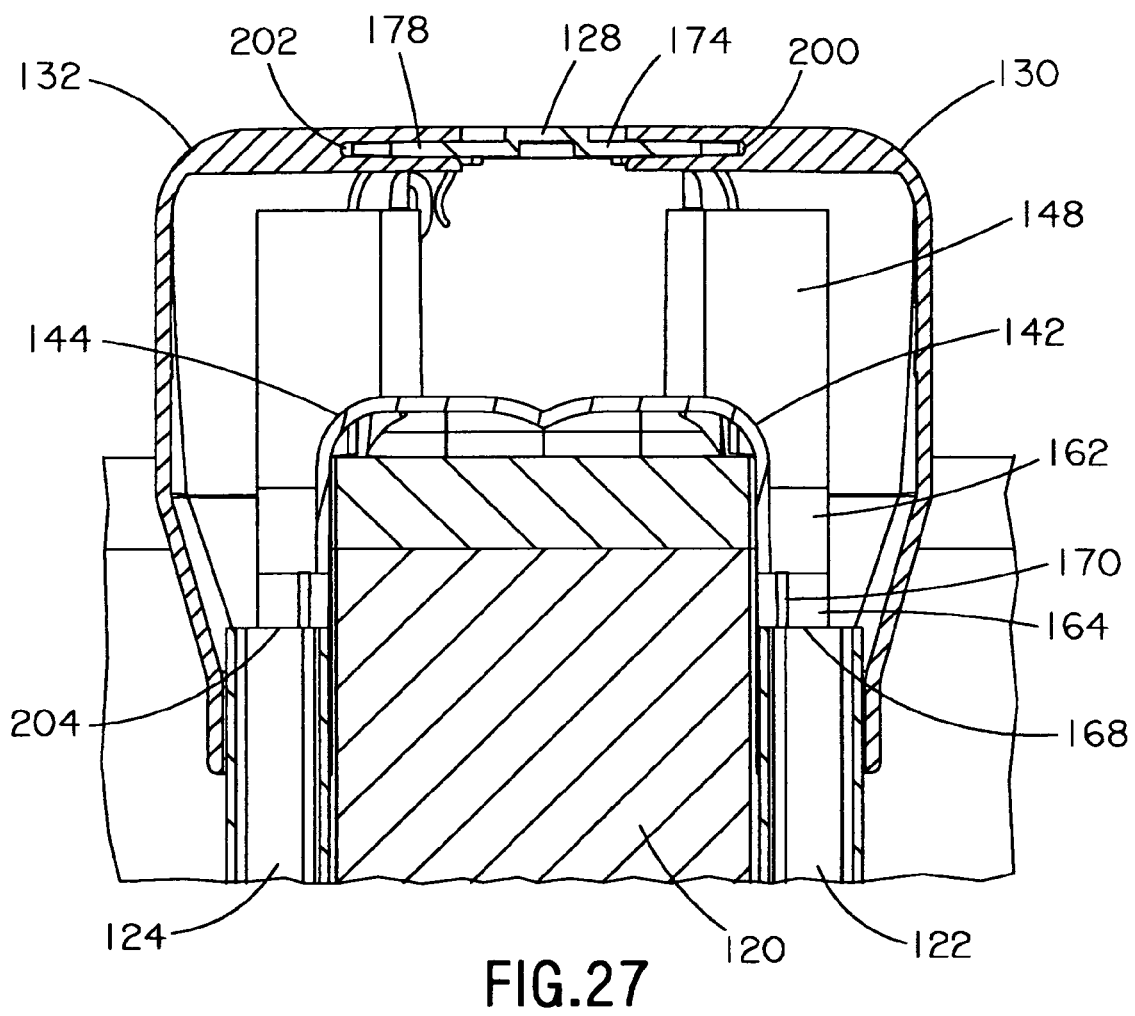
FIG. 27 is a cross-sectional view similar to FIG. 24 of the raceway system of FIG. 18.

As shown in FIGS. 24 and 27, the first vertical raceway section 122 is positioned below the first spillover side 142, with the end 168 of the first vertical raceway section 122 abutting the ribs 166, 170. Similarly, as also shown in FIGS. 24 and 27, the second vertical raceway section 124 is positioned below the second spillover side 144, with an end 204 of the second vertical raceway section 124 abutting the ribs. Cables 34 are then routed into one or both of the first and second vertical raceway sections 122, 124.

The first cover cap 130 is fitted and locked into the cover 128 and the base 126 once the first groove 200 receives the first shelf 174 and the latches 152, 156 snap-lock into the grooves 150, 154, respectively, of the base 126, while the latches of the first cover cap 130 engage the notches 188, 190 to retain the first vertical raceway section 122 therein. Finally, the second cover cap 132 is fitted and locked into the cover 128 and the base 126 once the second groove 202 receives the second shelf 178 and the latches 184, 186 snap-lock into the grooves of the base 126, while the latches 192, 194 engage the notches 196, 198, respectively, to retain the second vertical raceway section 124 therein.

The disclosed invention provides an adjustable mid-panel spillover fitting. The fitting includes a cover cap securable to a base in a plurality of predetermined positions, and the cover cap is adjustable between the plurality of predetermined positions. It should be noted that the above-described and illustrative embodiments and preferred embodiments of the invention are not an exhaustive listing of the forms such an adjustable mid-panel spillover fitting in accordance with the invention might take; rather, they serve as exemplary and illustrative of embodiments of the invention as presently understood. By way of example, and without limitation, an adjustable mid-panel spillover fitting having a cover cap adjustable between any one of five or more predetermined positions is contemplated to be within the scope of the invention. Many other forms of the invention are believed to exist.

The invention claimed is:

1. An adjustable mid-panel spillover fitting comprising:
 a base having a spillover side;
 a cover securable to the base, the cover having an opening on a side wall thereof; and
 a cover cap securable to the base and the cover, the cover cap having at least one latch on an inside surface thereof and being adjustable between a plurality of predetermined positions on said base.

2. The fitting of claim 1, wherein the base is mounted to a top surface of an office furniture panel.

3. The fitting of claim 1, wherein the base has a plurality of flanges.

4. The fitting of claim 3, wherein the base has four flanges.

5. The fitting of claim 1, wherein the base has a plurality of slots.

6. The fitting of claim 5, wherein the base has four slots.

7. The fitting of claim 1, wherein the spillover side has two vertical walls.

8. The fitting of claim 7, wherein the spillover side has two tapered sections adjacent the vertical walls and two side walls adjacent the tapered sections, the side walls forming a channel having a width substantially equal to a width of the vertical raceway section.

9. The fitting of claim 8, wherein each side wall has a rib on an inside surface thereof.

10. The fitting of claim 7, wherein each vertical wall has a plurality of grooves on an outside surface thereof.

11. The fitting of claim 1, wherein the cover is U-shaped.

12. The fitting of claim 1, wherein the cover has a plurality of ribs on an inside surface thereof.

13. The fitting of claim 1, wherein the cover has a shelf extending toward the side wall.

14. The fitting of claim 1, wherein the cover has a length greater than a length of the base.

15. The fitting of claim 1, wherein the cover cap has two latches.

16. The fitting of claim 1, wherein the cover cap has a groove.

17. The fitting of claim 1, wherein the cover cap is adjustable between any one of four predetermined positions.

18. An adjustable mid-panel spillover fitting comprising:
a base having a first spillover side and a second spillover side;
a cover securable to the base, the cover having a first opening on a firs side wall thereof and a second opening on a second side wall thereof;
a first cover cap securable to the base and the cover, the first cover cap having at least one latch on an inside surface thereof and being adjustable between a first plurality of predetermined positions on said base; and
a second cover cap securable to the base and the cover, the second cover cap having at least one latch on an inside surface thereof and being adjustable between a second plurality of predetermined positions on said base.

* * * * *